US011197271B2

(12) United States Patent
Sahlin et al.

(10) Patent No.: US 11,197,271 B2
(45) Date of Patent: *Dec. 7, 2021

(54) UPLINK MULTI-TTI SCHEDULING IN TDD SYSTEM

(71) Applicant: Telefonaktiebolaget LM Ericsson (publ), Stockholm (SE)

(72) Inventors: Henrik Sahlin, Mölnlycke (SE); Mattias Frenne, Uppsala (SE); Johan Furuskog, Stockholm (SE); Stefan Parkvall, Bromma (SE); Qiang Zhang, Täby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 30 days.

This patent is subject to a terminal disclaimer.

(21) Appl. No.: 16/351,014

(22) Filed: Mar. 12, 2019

(65) Prior Publication Data

US 2019/0215805 A1 Jul. 11, 2019

Related U.S. Application Data

(63) Continuation of application No. 15/900,328, filed on Feb. 20, 2018, now Pat. No. 10,271,309, which is a
(Continued)

(51) Int. Cl.
*H04W 72/04* (2009.01)
*H04L 5/14* (2006.01)
*H04W 72/12* (2009.01)

(52) U.S. Cl.
CPC .............. *H04W 72/04* (2013.01); *H04L 5/14* (2013.01); *H04W 72/1289* (2013.01)

(58) Field of Classification Search
None
See application file for complete search history.

(56) References Cited

U.S. PATENT DOCUMENTS 8,559,343 B2 10/2013 Parkvall et al.
8,897,276 B2 * 11/2014 Ranta-Aho ......... H04W 74/004
370/338
(Continued)

FOREIGN PATENT DOCUMENTS

WO 2009022314 A2 2/2009

OTHER PUBLICATIONS

Examination Report for Indian Patent Application No. 201617026886, dated Nov. 19, 2019, 6 pages.
(Continued)

*Primary Examiner* — Mariela Vidal Carpio
(74) *Attorney, Agent, or Firm* — Withrow & Terranova, PLLC

(57) ABSTRACT

Systems and methods are disclosed for transmission and reception of an uplink grant during a gap created in radio resources assigned by a previous multiple Transmit Time Interval (multi-TTI) uplink grant in a system operating according to a Time Division Duplexing (TDD) scheme. In one embodiment, a method of operation of a wireless device operating according to a TDD scheme in a cellular communications network includes: receiving a first uplink grant from a radio network node that assigns first radio resources for a first multiple transmit time interval uplink transmission, the first radio resources comprising a set of consecutive subframes; and interrupting an uplink transmission on the first radio resources during a gap in the first radio resources assigned for the first multiple transmit time interval uplink transmission, the gap comprising a time domain gap within the set of consecutive subframes.

30 Claims, 28 Drawing Sheets

Related U.S. Application Data continuation of application No. 14/212,927, filed on Mar. 14, 2014, now Pat. No. 9,942,881.

(56) References Cited

U.S. PATENT DOCUMENTS

| | | | |
|---|---|---|---|
| 9,319,130 | B2 | 4/2016 | Parkvall et al. |
| 9,942,881 | B2 | 4/2018 | Sahlin et al. |
| 2009/0046605 | A1* | 2/2009 | Gao ............... H04W 72/14 370/280 |
| 2010/0074211 | A1 | 3/2010 | Kim et al. |
| 2010/0290420 | A1* | 11/2010 | Dalsgaard ............ H04L 5/006 370/329 |
| 2011/0053625 | A1* | 3/2011 | Ishii ............... H04L 1/1887 455/507 |
| 2011/0149813 | A1 | 6/2011 | Parkvall et al. |
| 2011/0239072 | A1* | 9/2011 | Cai ................. H04L 1/1896 714/748 |
| 2011/0299486 | A1 | 12/2011 | Wu |
| 2012/0020310 | A1 | 1/2012 | Ji et al. |
| 2012/0182958 | A1* | 7/2012 | Pelletier ............ H04L 5/0096 370/329 |
| 2012/0252487 | A1* | 10/2012 | Siomina ............... G01S 5/10 455/456.1 |
| 2012/0257519 | A1 | 10/2012 | Frank et al. |
| 2012/0294206 | A1* | 11/2012 | Zhang ............... H04W 56/003 370/280 |
| 2013/0107828 | A1 | 5/2013 | Dinan |
| 2013/0315182 | A1 | 11/2013 | Kitou et al. |
| 2013/0343239 | A1 | 12/2013 | Damnjanovic et al. |
| 2013/0343273 | A1 | 12/2013 | Barbieri et al. |
| 2014/0022966 | A1 | 1/2014 | Parkvall et al. |
| 2014/0086116 | A1 | 3/2014 | Seo et al. |
| 2014/0126499 | A1 | 5/2014 | Li et al. |
| 2014/0192767 | A1 | 7/2014 | Au et al. |
| 2014/0328260 | A1* | 11/2014 | Papasakellariou .... H04L 1/1861 370/329 |
| 2014/0369292 | A1* | 12/2014 | Wu ................. H04W 72/04 370/329 |
| 2015/0078222 | A1* | 3/2015 | Yang ............... H04L 5/0092 370/280 |
| 2015/0103749 | A1* | 4/2015 | Kela ................ H04L 1/1835 370/329 |
| 2015/0117181 | A1* | 4/2015 | Lee ................. H04W 76/34 370/225 |
| 2015/0188793 | A1* | 7/2015 | Zhao ................ H04L 5/1469 370/242 |
| 2015/0201431 | A1 | 7/2015 | Um et al. |
| 2015/0230137 | A1* | 8/2015 | Li ................... H04L 5/0055 370/331 |
| 2015/0264662 | A1 | 9/2015 | Sahlin et al. |
| 2015/0289261 | A1 | 10/2015 | Oizumi et al. |
| 2015/0304096 | A1* | 10/2015 | Sahlin ............. H04L 27/2602 370/280 |
| 2015/0358133 | A1 | 12/2015 | Kusashima et al. |
| 2016/0095134 | A1 | 3/2016 | Chen et al. |
| 2016/0112892 | A1* | 4/2016 | Damnjanovic ... H04W 72/0446 370/336 |
| 2016/0174238 | A1 | 6/2016 | Chen et al. |
| 2016/0353389 | A1* | 12/2016 | Wang ............... H04W 52/44 |
| 2016/0360550 | A1 | 12/2016 | Chen et al. |
| 2017/0331595 | A1* | 11/2017 | Rudolf .............. H04L 1/1822 |
| 2018/0192399 | A1 | 7/2018 | Sahlin et al. |

OTHER PUBLICATIONS

Author Unknown, "3rd Generation Partnership Project; Technical Specification Group Radio Access Network Evolved Universal Terrestrial Radio Access (E-UTRA); Physical Channels and Modulation (Release 11)," Technical Specification 36.211, Version 11.3.0, Jun. 2013, 3GPP Organizational Partners, 108 pages.

Author Unknown, "3rd Generation Partnership Project; Technical Specification Group Radio Access Network Evolved Universal Terrestrial Radio Access (E-UTRA); Multiplexing and channel coding (Release 11)," Technical Specification 36.212, Version 11.3.0, Jun. 2013, 3GPP Organizational Partners, 84 pages.

Author Unknown, "3rd Generation Partnership Project; Technical Specification Group Radio Access Network Evolved Universal Terrestrial Radio Access (E-UTRA); Physical layer procedures (Release 11)," Technical Specification 36.213, Version 11.3.0, Jun. 2013, 3GPP Organizational Partners, 176 pages.

CATT, "R1-071882: TTI Indication for LTE TDD," 3rd Generation Partnership Project (3GPP), TSG RAN WG1 LTE TDD Ad Hoc, Apr. 17-20, 2007, 4 pages, Beijing, China.

CATT, "R2-133228: Dynamic scheduling of TTI bundling," 3rd Generation Partnership Project (3GPP), TSG RAN WG2 Meeting #83bis, Oct. 7-11, 2013, 3 pages, Ljubljana, Slovenia.

CMCC et al., "R1-081670: Way forward of UL HARQ timing and Multi-TTI scheduling," Apr. 9, 2008, available from www.3gpp. org/ftp/tsg_ran/wg1_rl1/TSGR1_52b/Docs/R1-081670.zip, 4 pages.

LG Electronics Inc., "R2-133351: TTI Bundle Shifting," 3rd Generation Partnership Project (3GPP), TSG-RAN2 Meeting #83bis, Oct. 7-11, 2013, 2 pages, Ljubljana, Slovenia.

Panasonic, "R2-133312: Support of dynamic scheduling of TTI bundle transmissions," 3rd Generation Partnership Project (3GPP), TSG RAN WG2 Meeting #83bis, Oct. 7-10, 2013, 4 pages, Ljubljana, Slovenia.

Non-Final Office Action for U.S. Appl. No. 14/212,927, dated Apr. 21, 2016, 21 pages.

Final Office Action for U.S. Appl. No. 14/212,927, dated Oct. 20, 2016, 24 pages.

Non-Final Office Action for U.S. Appl. No. 14/212,927, dated Jan. 31, 2017, 19 pages.

Final Office Action for U.S. Appl. No. 14/212,927, dated Aug. 14, 2017, 24 pages.

Notice of Allowance for U.S. Appl. No. 14/212,927, dated Nov. 29, 2017, 10 pages.

International Search Report and Written Opinion for International Patent Application No. PCT/IB2015/051863, dated Jun. 9, 2015, 11 pages.

International Preliminary Report on Patentability for International Patent Application No. PCT/IB2015/051863, dated Sep. 22, 2016, 8 pages.

Examination Report for European Patent Application No. 15712698. 8, dated Dec. 8, 2017, 5 pages.

Non-Final Office Action for U.S. Appl. No. 15/900,328, dated Jun. 7, 2018, 10 pages.

Final Office Action for U.S. Appl. No. 15/900,328, dated Oct. 1, 2018, 5 pages.

Notice of Allowance for U.S. Appl. No. 15/900,328, dated Dec. 12, 2018, 8 pages.

* cited by examiner

| UPLINK-DOWNLINK CONFIGUR-ATION | DOWNLINK -TO- UPLINK SWITCH- POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

FIG. 1

UPLINK MULTI-TTI SCHEDULING IN TDD SYSTEM

RELATED APPLICATIONS

This application is a continuation of patent application Ser. No. 15/900,328, filed Feb. 20, 2018, now U.S. Pat. No. 10,271,309, which is a continuation of patent application Ser. No. 14/212,927, filed Mar. 14, 2014, now U.S. Pat. No. 9,942,881, the disclosures of which are hereby incorporated herein by reference in their entireties.

FIELD OF THE DISCLOSURE

The present disclosure relates to a cellular communications network and, in particular, multiple Transmit Time Interval (multi-TTI) uplink scheduling in a Time Division Duplexing (TDD) system.

BACKGROUND

Some important features in future cellular communications networks are higher bitrates and shorter delays applied to small cell scenarios. Higher bitrates can, for example, be achieved by using higher carrier frequencies where wideband spectrum resources are available. In addition, Time Division Duplexing (TDD), and in particular dynamic TDD, has attained an increased interest because downlink or uplink bitrates can be instantaneously increased by adaptively changing the relation between the number of intervals used for the downlink and the uplink.

In 3rd Generation Partnership Project (3GPP) Long Term Evolution (LTE) Release 11 (Rel-11), the downlink is based on Orthogonal Frequency Division Multiplexing (OFDM) while the uplink is based on Discrete Fourier Transform (DFT) spread OFDM, i.e. Single Carrier Frequency Division Multiple Access (SC-FDMA), see, for example, 3GPP Technical Specification (TS) 36.211, Evolved Universal Terrestrial Radio Access (E-UTRA); Physical Channels and Modulation, V11.3.0. Here, the Transmission Time Interval (TTI) equals a subframe of 1 millisecond (ms), which consists of 14 OFDM symbols in the downlink and 14 SC-FDMA symbols in the uplink for the user data in the Physical Downlink Shared Channel (PDSCH) and the Physical Uplink Shared Channel (PUSCH) with normal length of the cyclic prefix. In future cellular communications networks, the length of a subframe might be significantly reduced in order to reduce user data delays. Also, the uplink and downlink ratios in future TDD systems may be significantly better optimized to various types of traffic supporting much larger uplink and downlink asymmetries than today. The switching between downlink and uplink is typically done on a subframe basis. Furthermore, in future cellular communications systems, both the downlink and the uplink might be based on the same radio access technology, such as, for example, OFDM or SC-FDMA.

When using TDD, the same frequency is used for both a downlink from a base station to a wireless device and an uplink from the wireless device to the base station. Both the wireless device and the base station must switch between transmitting and receiving, assuming that full duplex operation is not possible. Further, in 3GPP LTE Rel-11, a fixed allocation of uplink and downlink subframes is used, as specified in 3GPP TS 36.211 V11.3.0. A few predefined allocations are specified in 3GPP LTE Rel-11, as illustrated in FIG. 1. The number of uplink subframes for user data transmission in each 10 ms radio frame is between 1 and 6, which means a maximum of 60% of the total subframes in each radio frame can be used for uplink traffic. Here, a special subframe is inserted between downlink and uplink subframes, as illustrated in FIG. 2. The special subframe contains OFDM and SC-FDMA symbols for the downlink and the uplink, respectively, with a Guard Period (GP) in between. The guard period provides time for transmit and receive circuitry of the base station to switch from downlink transmission to uplink reception and time for transmit and receive circuitry of the wireless device to switch from downlink reception to uplink transmission.

The radio network node sends control signaling to the wireless device that includes a downlink assignment that indicates when and how the wireless device is scheduled to receive in the downlink and an uplink grant that indicates when and how the wireless device is to transmit in the uplink. In LTE, this control signaling is carried by either the Physical Downlink Control Channel (PDCCH) or the Enhanced PDCCH (EPDCCH). The downlink assignment is transmitted in the same subframe of the downlink in which the corresponding user data is transmitted. Conversely, the uplink grant is transmitted in the downlink a few subframes before the wireless device is scheduled to transmit in the uplink. More specifically, as illustrated in FIG. 3, if an uplink grant is transmitted in downlink subframe n, the wireless device can start uplink transmission in subframe n+g, where g is an uplink scheduling delay. For LTE TDD, the minimum uplink scheduling delay (g) is four subframes, which corresponds to 4 ms. However, the actual uplink scheduling delay depends on the uplink/downlink subframe allocation. So, in some cases, the uplink scheduling delay (g) can be larger than 4 ms. For instance, in the example of FIG. 3, an uplink grant is transmitted in the downlink in subframe 1 in order to grant radio resources for an uplink transmission in subframe 7. In this case, the uplink scheduling delay (g) is 6 subframes, which is equivalent to 6 ms. Likewise, in this example, an uplink grant is transmitted in the downlink in subframe 9 in order to grant radio resources for an uplink transmission in subframe 13. In this case, the uplink scheduling delay (g) is 4 subframes, which is equivalent to 4 ms. For more information regarding uplink scheduling, the interested reader is directed to 3GPP TS 36.213, Evolved Universal Terrestrial Radio Access (E-UTRA); Physical layer procedures (Release 11), V11.3.0.

Multiple Transmit Time Interval (multi-TTI) uplink grants are supported in LTE TDD uplink/downlink configuration 0. As illustrated in FIG. 4, a multi-TTI uplink grant schedules uplink transmissions in multiple uplink subframes. Currently, a maximum of two uplink subframes are scheduled with one multi-TTI uplink grant, as specified in 3GPP TS 36.213 V11.3.0. In the particular example of FIG. 4, a multi-TTI uplink grant is transmitted in the downlink in subframe 1 in order to grant uplink resources in subframes 7 and 8. Similarly, a multi-TTI uplink grant is transmitted in the downlink in subframe 5 in order to grant uplink resources in subframes 9 and 12.

In a dynamic TDD system, the relation between the number of downlink subframes and uplink subframes is not fixed, but can be flexibly configured depending of the current need. For example, the downlink/uplink configuration can be dynamically signaled, or alternatively, a wireless device can treat a subframe as a downlink subframe unless explicitly instructed to transmit in the uplink, as described in commonly held and assigned U.S. Pat. No. 8,559,343 entitled FLEXIBLE SUBFRAMES, issued Oct. 15, 2013.

In future cellular communications networks with high density deployment and higher carrier frequency, the coverage area of a radio network node can be small. Hence, the number of wireless devices connected to each radio network node in the network can be low and the traffic in the network can change dramatically. In the extreme case, the traffic for a given cell served by a radio network node can be only download traffic or only upload traffic at a given point in time. This presents new problems that are not addressed in the present 3GPP LTE standards.

SUMMARY

Systems and methods are disclosed for transmission and reception of an uplink grant during a gap created in radio resources assigned by a previous multiple Transmit Time Interval (multi-TTI) uplink grant in a system operating according to a Time Division Duplexing (TDD) scheme. In one embodiment, a method of operation of a radio network node operating according to a TDD scheme in a cellular communications network is provided. The method of operation of the radio network node includes transmitting a first uplink grant that assigns first radio resources for a first multi-TTI uplink transmission, and transmitting a second uplink grant during a gap in the first radio resources assigned by the first uplink grant for the first multi-TTI uplink transmission. In one embodiment, the second uplink grant assigns second radio resources for a second multi-TTI uplink transmission. In one embodiment, by utilizing the gap to transmit the second uplink grant, uplink radio resources assigned for uplink transmission can be maximized, which is particularly beneficial in high uplink traffic conditions.

In one embodiment, the first radio resources assigned by the first uplink grant comprise a first set of consecutive subframes, and the gap in the first radio resources comprises a gap subframe within the first set of consecutive subframes.

In one embodiment, the gap is a time domain gap (e.g., a subframe), and a position of the gap is a position relative to an end of the first radio resources assigned by the first uplink grant for the first multi-TTI uplink transmission. Further, in one embodiment, an amount of time between the gap and the end of the first radio resources is greater than or equal to an uplink scheduling delay.

In one embodiment, the gap is a time domain gap, and a position of the gap is defined by a cellular communications network standard. In another embodiment, the method of operation of the radio network node further includes signaling a position of the gap to a wireless device. In one particular embodiment, signaling the position of the gap to the wireless device includes signaling the position of the gap to the wireless device via Radio Resource Control (RRC) signaling.

In one embodiment, a position of the gap is semi-statically configured. Further, in one embodiment, a position of the gap is semi-statically configured individually for a wireless device. In another embodiment, a position of the gap is semi-statically configured for a plurality of wireless devices.

In another embodiment, the method of operation of the radio network node further includes dynamically configuring the gap. In one embodiment, dynamically configuring the gap comprises providing a position of the gap in the first uplink grant. In another embodiment, dynamically configuring the gap includes providing an indication of the gap in the first uplink grant.

In one embodiment, the method of operation of the radio network node further includes, prior to transmitting the second uplink grant during the gap, determining whether the gap is to be used. The method further includes transmitting the second uplink grant during the gap in response to determining that the gap is to be used. In one embodiment, the method of operation of the radio network node further includes determining that the gap is to be used if a number of transmit time intervals assigned in the first uplink grant is greater than a predefined threshold. In one embodiment, the predefined threshold is greater than or equal to an uplink scheduling delay.

In another embodiment, the gap is a time domain gap, a position of the gap is a predefined position relative to an end of the first radio resources assigned for the first multi-TTI uplink transmission by the first uplink grant, and the method of operation of the radio network node further includes determining that the gap is not to be used if the position of the gap is prior to a start of the first radio resources assigned by the first uplink grant.

In another embodiment, the method of operation of the radio network node further includes determining that the gap is to be used if an uplink traffic level of a corresponding cell served by the radio network node is greater than a predefined threshold.

In another embodiment, the method of operation of the radio network node further includes determining that the gap is to be used if an uplink traffic level of a corresponding cell served by the radio network node is greater than a first predefined threshold and a downlink traffic level of the corresponding cell served by the radio network node is less than a second predefined threshold.

In another embodiment, the method of operation of the radio network node further includes determining that the gap is not to be used if a fixed downlink subframe that can be used to provide the second uplink grant occurs within the first radio resources assigned for the first multi-TTI uplink transmission.

In one embodiment, multiple subframes spanned by the first radio resources assigned for the first multi-TTI uplink transmission are the same subframes as those spanned by radio resources assigned for multi-TTI uplink transmissions by multiple wireless devices, and the gap is the same gap as that configured for the multiple wireless devices.

In one embodiment, a method of operation of a wireless device operating according to a TDD scheme in a cellular communications network is provided. In one embodiment, the method of operation of the wireless device includes receiving a first uplink grant from a radio network node that assigns first radio resources for a first multi-TTI uplink transmission and listening for a second uplink grant from the radio network node during a gap in the first radio resources assigned for the first multi-TTI uplink transmission. In one embodiment, listening for a second uplink grant comprises receiving a second uplink grant from the radio network node during the gap in the first radio resources assigned for the first multi-TTI uplink transmission. In one embodiment, the second uplink grant assigns second radio resources for a second multi-TTI uplink transmission. In one embodiment, by utilizing the gap, uplink radio resources assigned for uplink transmission to the radio network node can be maximized, which is particularly beneficial in high uplink traffic conditions.

In one embodiment, the first radio resources assigned by the first uplink grant comprise a first set of consecutive subframes, and the gap in the first radio resources comprises a gap subframe within the first set of consecutive subframes.

In one embodiment, the method of operation of the wireless device further includes performing a first portion of the first multi-TTI uplink transmission prior to listening for a second uplink grant during the gap and performing a remaining portion of the first multi-TTI uplink transmission after listening for a second uplink grant during the gap.

In one embodiment, the gap is a time domain gap, and a position of the gap is a position relative to an end of the first radio resources assigned for the first multi-TTI uplink transmission by the first uplink grant. In one embodiment, an amount of time between the gap and the end of the first radio resources is greater than or equal to an uplink scheduling delay. In another embodiment, the gap is a time domain gap, and a position of the gap is defined by a cellular communications network standard. In another embodiment, the method of operation of the wireless device further includes receiving signaling including an indication of a position of the gap from the radio network node. In one embodiment, the signaling is RRC signaling.

In one embodiment, a position of the gap is semi-statically configured. In another embodiment, a position of the gap is semi-statically configured individually for the wireless device. In another embodiment, a position of the gap is semi-statically configured for a plurality of wireless devices including the wireless device.

In one embodiment, the method of operation of the wireless device further includes receiving a dynamic configuration of the gap. In one embodiment, receiving the dynamic configuration of the gap includes receiving a position of the gap in the first uplink grant. In another embodiment, receiving the dynamic configuration of the gap includes receiving an indication of the gap in the first uplink grant.

In one embodiment, the method of operation of the wireless device further includes, prior to listening for a second uplink grant during the gap, determining whether the gap is to be used. The method of operation of the wireless device further includes listening for a second uplink grant during the gap in response to determining that the gap is to be used. In one embodiment, the method of operation of the wireless device further includes determining that the gap is to be used if a number of Transmit Time Intervals (TTIs) assigned in the first uplink grant are greater than a predefined threshold. In one embodiment, the predefined threshold is greater than or equal to an uplink scheduling delay.

In another embodiment, the gap is a time domain gap, a position of the gap is a predefined position relative to an end of the first radio resources assigned for the first multi-TTI uplink transmission by the first uplink grant, and the method of operation of the wireless device further includes determining that the gap is not to be used if the position of the gap is prior to a start of the first radio resources assigned by the first uplink grant.

In another embodiment, the method of operation of the wireless device further includes determining that the gap is not to be used if a fixed downlink subframe that can be used to receive the second uplink grant occurs within the first radio resources assigned for the first multi-TTI uplink transmission.

In one embodiment, a radio network node operating according to a TDD scheme in a cellular communications network is provided. In one embodiment, the radio network node includes a transceiver, a processor associated with the transceiver, and a memory containing instructions executable by the processor whereby the radio network node is operative to transmit, via the transceiver, a first uplink grant that assigns first radio resources for a first multi-TTI uplink transmission, and transmit, via the transceiver, a second uplink grant that assigns second radio resources for a second multi-TTI uplink transmission during a gap in the first radio resources assigned for the first multi-TTI uplink transmission. The instructions may be such that the radio network node may be further operative to perform any of the methods of operation of a radio network node discussed above.

In another embodiment, the radio network node is adapted to transmit a first uplink grant that assigns first radio resources for a first multi-TTI uplink transmission, and transmit a second uplink grant that assigns second radio resources for a second multi-TTI uplink transmission during a gap in the first radio resources assigned for the first multi-TTI uplink transmission. The radio network node may be further adapted to perform any of the methods of operation of a radio network node discussed above.

In another embodiment, the radio network node includes a means for transmitting a first uplink grant that assigns first radio resources for a first multi-TTI uplink transmission, and a means for transmitting a second uplink grant that assigns second radio resources for a second multi-TTI uplink transmission during a gap in the first radio resources assigned for the first multi-TTI uplink transmission.

In another embodiment, a computer program is provided that includes instructions which, when executed on at least one processor of a radio network node, cause the at least one processor of the radio network node to carry out any of the methods of operation of a radio network node discussed above. In another embodiment, a carrier containing the aforementioned computer program is provided, where the carrier is one of an electronic signal, an optical signal, a radio signal, or a computer readable storage medium (e.g., a non-transitory computer readable medium).

In one embodiment, a wireless device operating according to a TDD scheme in a cellular communications network is provided. In one embodiment, the wireless device includes a transceiver, a processor associated with the transceiver, and a memory containing instructions executable by the processor whereby the wireless device is operative to receive, via the transceiver, a first uplink grant from a radio network node that assigns first radio resources for a first multi-TTI uplink transmission, and listen, via the transceiver, for a second uplink grant from the radio network node during a gap in the first radio resources assigned for the first multi-TTI uplink transmission. In one embodiment, the wireless device receives a second uplink grant from the radio network node that assigns second radio resources for a second multi-TTI uplink transmission during the gap in the first radio resources assigned for the first multi-TTI uplink transmission. The instructions may be such that the wireless device may be further operative to perform any of the methods of operation of a wireless device discussed above.

In another embodiment, the wireless device is adapted to receive a first uplink grant from a radio network node that assigns first radio resources for a first multi-TTI uplink transmission, and listen for a second uplink grant from the radio network node that assigns second radio resources for a second multi-TTI uplink transmission during a gap in the first radio resources assigned for the first multi-TTI uplink transmission. In one embodiment, the wireless device receives a second uplink grant from the radio network node that assigns second radio resources for a second multi-TTI uplink transmission during the gap in the first radio resources assigned for the first multi-TTI uplink transmission. The wireless device may be further adapted to perform any of the methods of operation of a wireless device discussed above.

In another embodiment, the wireless device includes a means for receiving a first uplink grant from a radio network node that assigns first radio resources for a first multi-TTI uplink transmission, and a means for listening for a second uplink grant from the radio network node that assigns second radio resources for a second multi-TTI uplink transmission during the gap in the first radio resources assigned for the first multi-TTI uplink transmission. In one embodiment, the means for listening for a second uplink grant includes a means for receiving a second uplink grant from the radio network node that assigns second radio resources for a second multi-TTI uplink transmission during the gap in the first radio resources assigned for the first multi-TTI uplink transmission.

In another embodiment, a computer program is provided that includes instructions which, when executed on at least one processor of a wireless device, cause the at least one processor of the wireless device to carry out any of the methods of operation of a wireless device discussed above. In another embodiment, a carrier containing the aforementioned computer program is provided, where the carrier is one of an electronic signal, an optical signal, a radio signal, or a computer readable storage medium (e.g., a non-transitory computer readable medium).

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates a number of uplink and downlink allocations defined in Release 11 of the 3rd Generation Partnership Project (3GPP) Long Term Evolution (LTE) specifications;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Time Division Duplexing (TDD) schemes in current cellular communications networks such as, for example, 3rd Generation Partnership Project (3GPP) Long Term Evolution (LTE) Release 11 (Rel-11) networks, suffer from a number of problems. More specifically, LTE Rel-11 uses a number of predefined fixed allocations of uplink and downlink subframes, where a maximum of 60% of the total subframes can be used for uplink data transmission. In a TDD cell with only or heavy uplink traffic at a particular point in time, the predefined fixed downlink subframes, which are a minimum of 40% of the total subframes, cannot be used for uplink traffic. As such, spectrum efficiency in the TDD cell is not optimized as it does not match the uplink/downlink traffic balance. On the other hand, even with heavy uplink traffic, some downlink subframes are still needed in order to transmit uplink grants for uplink data transmissions as well as to provide a reverse link for higher layer protocols depending on a service being provided.

To maximize the radio resources used for uplink traffic in a TDD cell with only or heavy uplink traffic, the number of downlink subframes needs to be reduced. Multiple Transmit Time Interval (multi-TTI) uplink scheduling can be used to further reduce the need for downlink subframes that contain uplink grants. In the current LTE specifications, the maximum number of uplink subframes that can be scheduled by a multi-TTI uplink grant is two subframes. Two subframes are not enough. As such, multi-TTI uplink grants that schedule more than two uplink subframes and, in particular, many subframes are desired.

Figure 2:
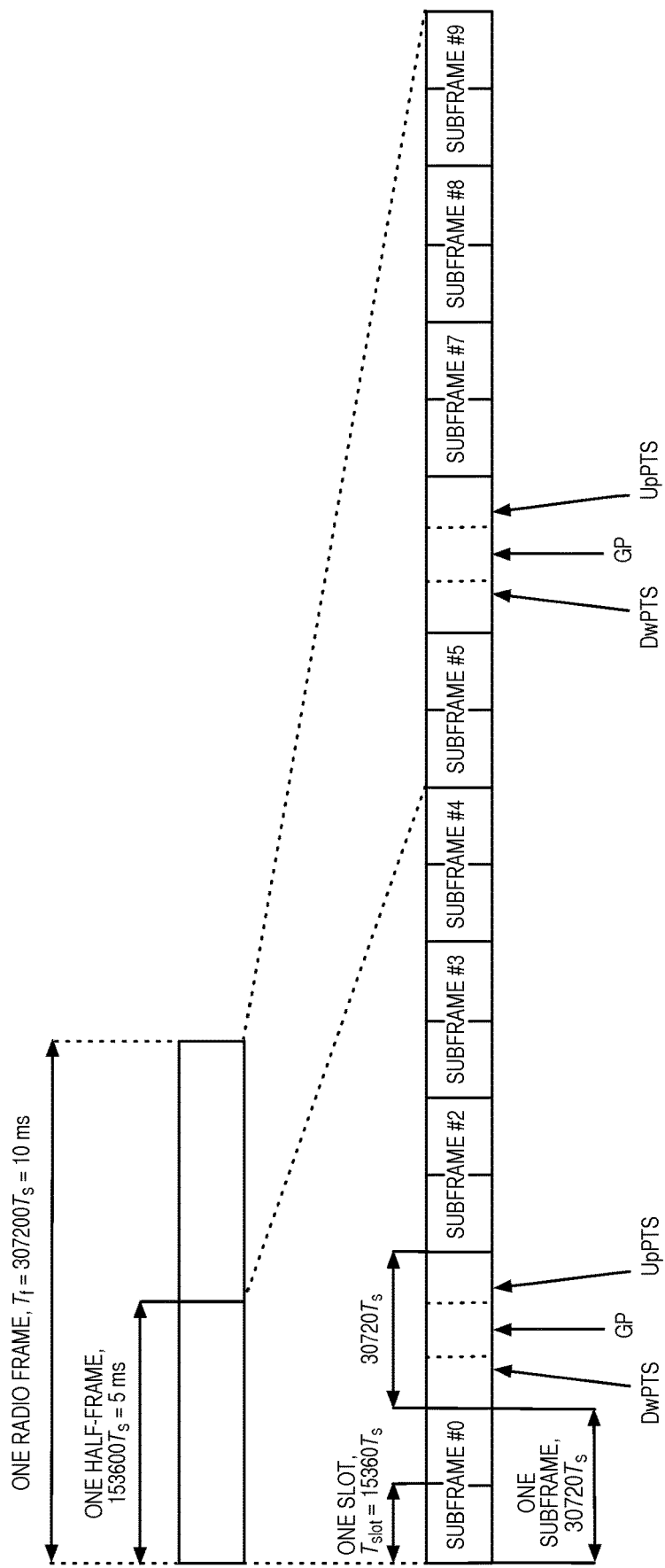
FIG. 2 illustrates a radio frame structure for Time Division Duplexing (TDD) operation in 3GPP LTE, where the radio frame structure includes a special subframe inserted between downlink and uplink subframes.
Figure 3:
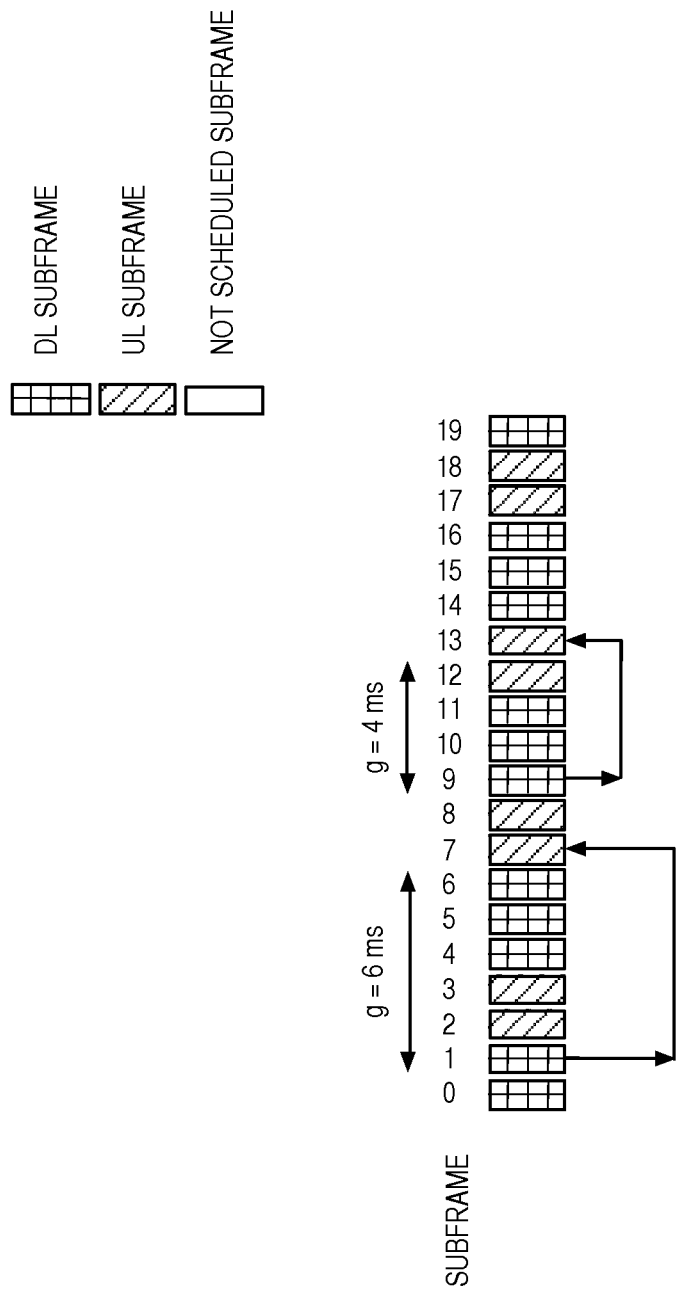
FIG. 3 illustrates an uplink scheduling delay between a subframe during which a wireless device receives an uplink grant and a time at which a corresponding uplink assignment begins.
Figure 4:
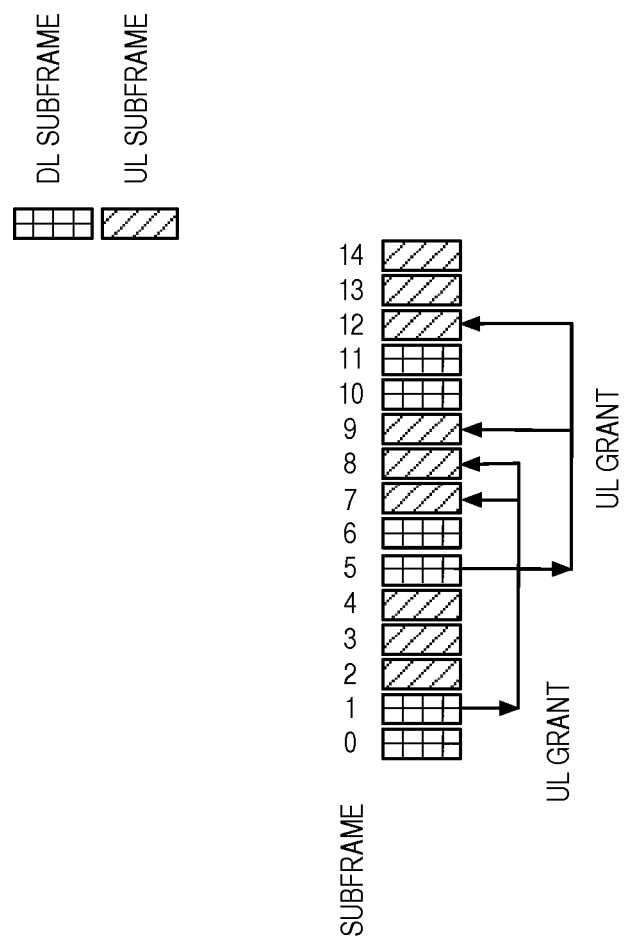
FIG. 4 illustrates a multiple Transmit Time Interval (multi-TTI) uplink grant.
Figure 5:
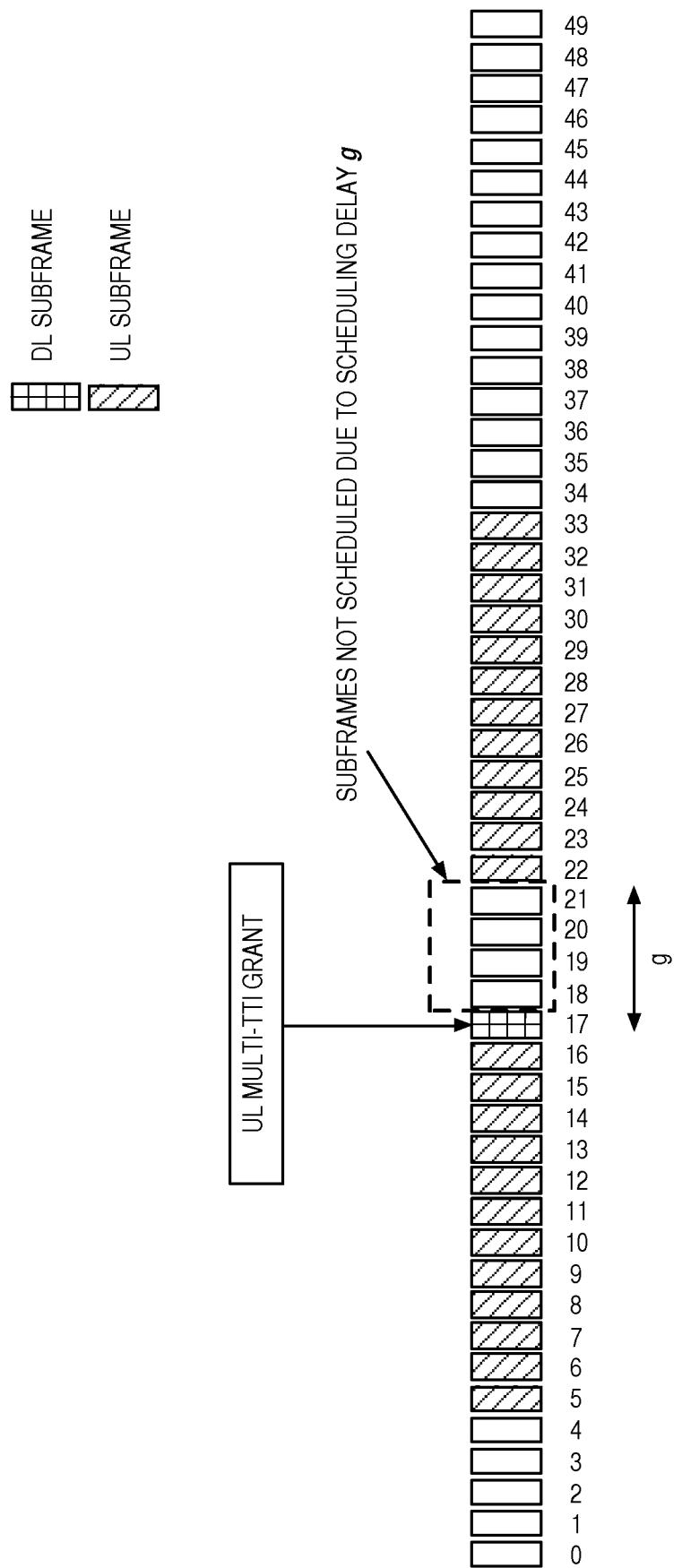
FIG. 5 illustrates a problem with conventional multi-TTI uplink grants where the uplink scheduling delay results in the number of subframes allocated for uplink transmission not being maximized.

When using multi-TTI uplink grants that schedule many uplink subframes to handle high uplink traffic, a problem occurs at the end of the scheduled period of uplink subframes due to the uplink scheduling delay (g). In particular, if many consecutive uplink subframes are scheduled by a multi-TTI uplink grant in a dynamic TDD system, then a new, or next, uplink grant must be transmitted in a downlink subframe after the scheduled period of uplink subframes. Then, due to the uplink scheduling delay (g), several subframes after the downlink subframe containing the new uplink grant cannot be used for uplink data transmission. As a result, system resources allocated for the uplink traffic are not maximized. An example that illustrates this problem is provided in FIG. 5. As illustrated in FIG. 5, a first period of uplink subframes (subframes 5-16) is scheduled by a first multi-TTI uplink grant (not shown). Subframe 17 is then used as a downlink subframe to transmit a second multi-TTI uplink grant. However, due to the uplink scheduling delay (g), which in this example is 4 subframes, uplink transmission cannot be scheduled to begin until subframe 22. As a result, subframes 18-21 are not used for uplink transmission and, as such, system resources allocated for the uplink traffic are not maximized.

Figure 6:
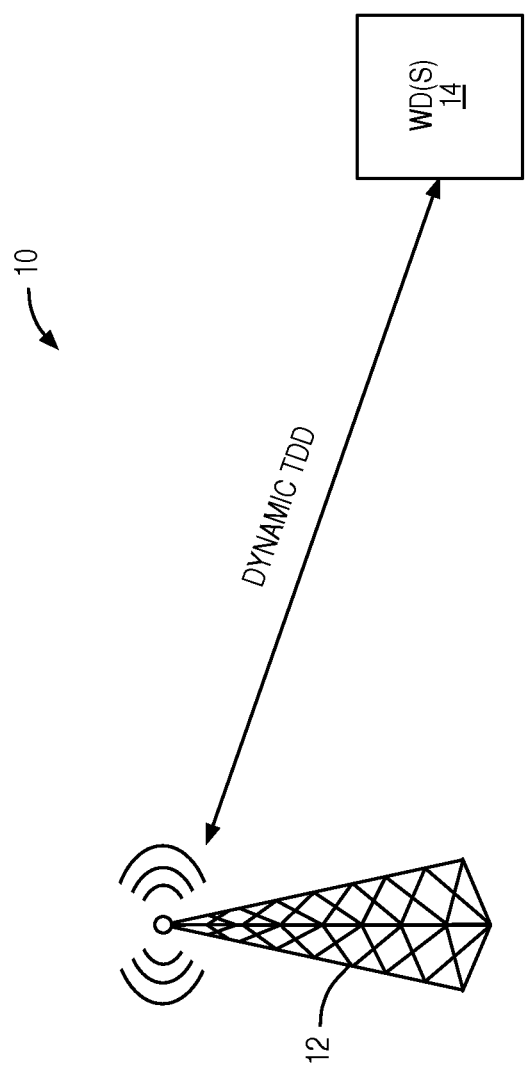
FIG. 6 illustrates a cellular communications network in which an uplink and a downlink between a base station and a wireless device are provided according to a TDD scheme and in which a gap is created in an uplink assignment of a multi-TTI uplink grant in order to enable transmission and reception of a next uplink grant according to one embodiment of the present disclosure.

Systems and methods are disclosed herein that can be used to maximize resources allocated for uplink traffic when using multi-TTI uplink grants, particularly in scenarios with only uplink traffic or heavy uplink traffic. In this regard, FIG. 6 illustrates a cellular communications network 10 including a base station 12 and one or more wireless devices 14. The base station 12 is a high power base station (e.g., an Evolved Node B (eNB) serving a macro cell) or a low power base station (e.g., a micro, pico, or home/femto eNB). The base station 12 serves a corresponding cell (e.g., a macro cell, a micro cell, a pico cell, or a femto cell) of the cellular communications network 10. Note that while the embodiments described herein are described with respect to the base station 12, the embodiments may be used for other types of radio network nodes (e.g., remote radio heads, access points (e.g., a Wi-Fi system where the roles of base station and wireless device are not static), etc.). Also, while the base station 12 and the wireless device(s) 14 are discussed herein, the concepts disclosed herein are also applicable to Device-to-Device (D2D) communications between two wireless devices 14. The wireless device(s) 14 can be any type of device(s) equipped with a wireless interference for transmitting an uplink to and receiving a downlink from the base station 12. Note that while only one base station 12 is illustrated for clarity and ease of discussion, the cellular communications network 10 typically includes many base stations 12. In one embodiment, the cellular communications network 10 is a 3GPP LTE network and, as such, 3GPP LTE terminology is sometimes used herein. However, the embodiments disclosed herein can be used in any type of wireless network that utilizes TDD (dynamic or non-dynamic) and multi-TTI uplink scheduling.

The base station 12 and the wireless device(s) 14 communicate according to a TDD scheme. In one embodiment, the TDD scheme is a dynamic TDD scheme. However, the embodiments disclosed herein are also applicable to non-dynamic TDD. As discussed in detail below, according to the dynamic TDD scheme, multiple (m) future subframes are scheduled in the uplink from the wireless device 14 by a multi-TTI uplink grant transmitted by the base station 12 in a single downlink subframe. There is a non-zero uplink scheduling delay of g subframes after an uplink grant (e.g., a multi-TTI uplink grant) is transmitted in a downlink subframe by the base station 12 until the wireless device 14 can begin to transmit uplink data. A value for the uplink scheduling delay (g) is selected to provide sufficient time for decoding of the uplink grant in the wireless device 14 and preparation of the next uplink transmission in the wireless device 14.

The dynamic TDD for the downlink and uplink between the base station 12 and the wireless device 14 may be configured (e.g., by higher layer signaling such as Radio Resource Control (RRC) signaling from the base station 12 to the wireless device 14) or specified by a corresponding standard to have a few fixed downlink subframes that can never be used for uplink transmission. Positions of the fixed downlink subframes may be configured or defined by the corresponding standard. The positions of the fixed downlink subframes may be defined, e.g., relative to synchronization signals such as, for instance, the Primary Synchronization Signal (PSS) or the Secondary Synchronization Signal (SSS) in LTE. Naturally, subframes where the base station 12 transmits synchronization signals (e.g., PSS and SSS) are fixed downlink subframes. However, there may also be other fixed downlink subframes that do not contain synchronization signals. For example, fixed downlink subframes may also be used for broadcast control messages from the base station 12 used for connection establishment between the base station 12 and the wireless device 14. The remaining subframes (i.e., the subframes other than the fixed downlink subframes) can be dynamically allocated for either downlink or uplink, depending on scheduling commands (i.e., downlink assignments and uplink grants) from the base station 12 to the wireless device 14. As such, the base station 12 can quickly adapt the uplink and downlink relative to traffic loads.

Note that, in some scenarios, the base station 12 transmits a multi-TTI uplink grant to the wireless device 14 that schedules uplink transmission for the wireless device 14 in multiple (m) consecutive subframes where a fixed downlink subframe occurs inside this set of m subframes. When this happens, the wireless device 14 cannot transmit during the fixed downlink subframe, but can continue afterwards if scheduled to do so. In this case, there are two alternatives to interpret the multi-TTI uplink grant of the multiple (m) consecutive subframes, namely: (a) the wireless device 14 continues to transmit the remaining subframes according to its uplink grant after the fixed downlink subframe for a total of m uplink subframes or (b) the wireless device 14 considers one uplink subframe punctured by the fixed downlink subframe such that the transmission effectively contains one less subframe scheduled in the uplink grant (i.e., m−1 subframes are actually transmitted by the wireless device 14 in the uplink).

In order to ensure continuous uplink scheduling without interruption despite the non-zero scheduling delay (g), a gap subframe is introduced in the set of m consecutive scheduled uplink subframes. In the gap subframe, the wireless device 14 does not transmit. Instead, the wireless device 14 monitors the downlink control channel from the base station 12 for a new uplink grant. The wireless device 14 may also receive a downlink shared data channel in the gap subframe if scheduled by the base station 12. Due to the gap subframe, the wireless device 14 can detect a new uplink grant with sufficient time before a transmission period of the new uplink grant begins (i.e., the gap subframe is at least g subframes prior to an end of the period of subframes assigned by the previous multi-TTI uplink grant).

Figure 7:
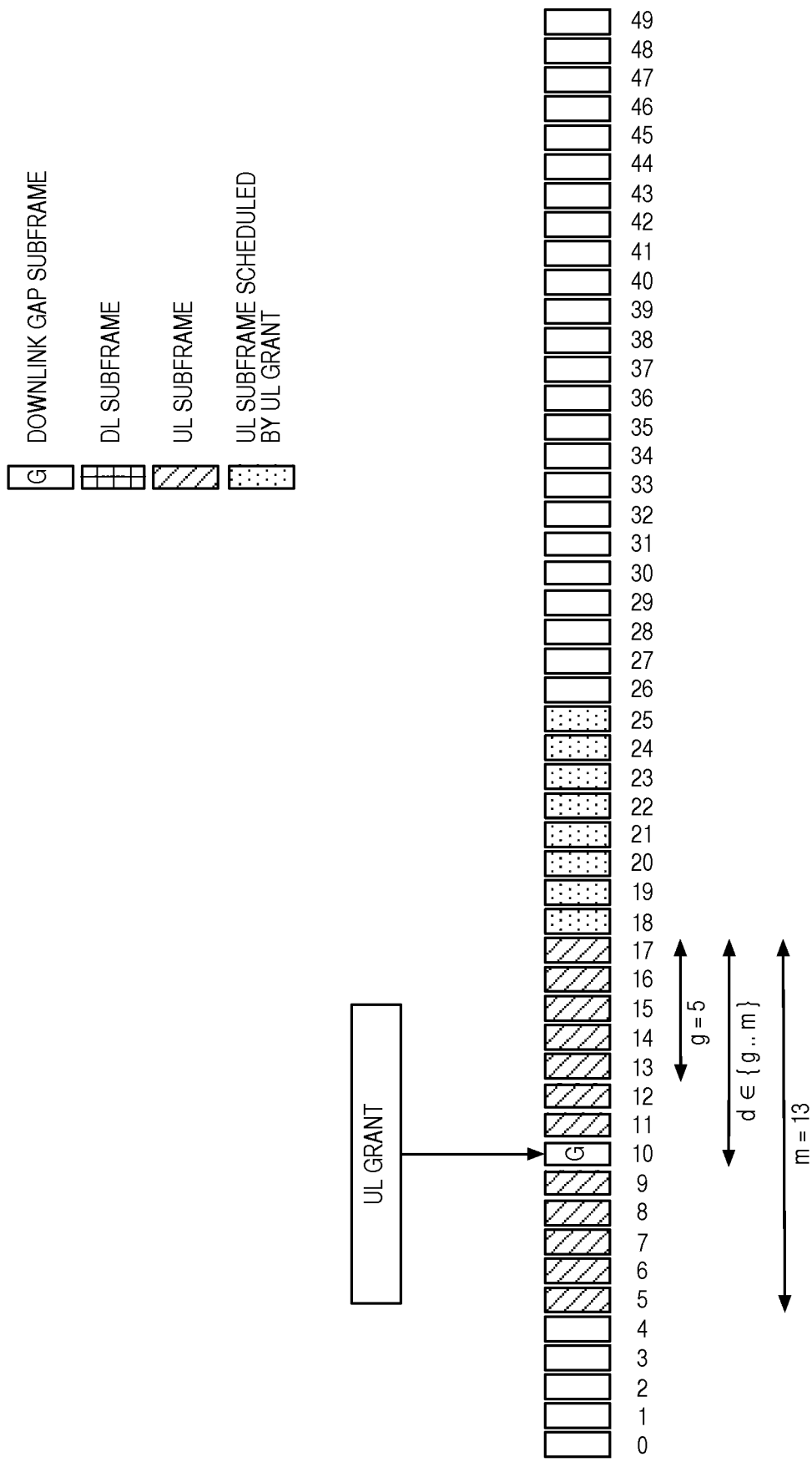
FIG. 7 illustrates one example of a gap subframe according to one embodiment of the present disclosure.

FIG. 7 illustrates one example of a gap subframe according to one embodiment of the present disclosure. In this example, the base station 12 previously transmitted a multi-TTI uplink grant (not shown) to schedule multiple (m) consecutive subframes for uplink transmission from the wireless device 14. In the particular example, m is equal to 13, and the subframes scheduled by the previous multi-TTI uplink grant are subframes 5-17. Subframes 5-17 are referred to herein as an uplink assignment of, or made by, the previous multi-TTI uplink grant or a period of subframes scheduled by the previous multi-TTI uplink grant.

A gap subframe (G) is introduced into the multiple (m) consecutive subframes scheduled by the previous multi-TTI uplink grant. In this embodiment, a position of the gap is relative to an end of the uplink assignment of the previous multi-TTI uplink grant. In particular, the position of the gap is a number (d) of subframes from the end of the uplink assignment, where in this example d∈{g, . . . , m}. In other words, for best efficiency and no interruption in uplink transmission by the wireless device 14, the position of the gap subframe (G) is greater than or equal to g subframes from the end of the uplink assignment and less than or equal to m subframes from the end of the uplink assignment (i.e., g≤d≤m). In one example, the position of the gap subframe (G) relative to the end of the uplink assignment is equal to the uplink scheduling delay (g) (i.e., d=g≤m). Note however, that the position of the gap subframe (G) (as defined by, in this example, d) can be any position prior to the last subframe in the uplink assignment (i.e., 1<d≤m). However, positions where 1<d<g will result in subframes between the two uplink assignments that cannot be used for uplink transmission, but the number of such subframes will be reduced as compared to that using conventional uplink scheduling techniques (i.e., an uplink grant in the subframe following the end of the previous uplink assignment).

A new multi-TTI uplink grant for a wireless device 14 is transmitted in the downlink from the base station 12 in the gap subframe (G) to provide a new uplink assignment for that wireless device 14. Note that the new multi-TTI uplink grant may be for the same wireless device 14 as the previous uplink grant or a different wireless device 14. By positioning the gap subframe (G) at g≤d≤m or, in one example, d=g≤m, the new uplink grant can start the new uplink assignment for the corresponding wireless device 14 in the subframe immediately following the end of the previous uplink assignment (i.e., the new uplink assignment can begin at subframe 18 as illustrated in this example). As a result, subframes that cannot be used for uplink transmission between the previous and new uplink assignments can be avoided, which in turn maximizes the amount of subframes for uplink transmission.

The position of the gap subframe (G) can be defined in any suitable manner. In one embodiment, the position of the gap subframe (G) within the uplink assignment is defined by a corresponding cellular communications network standard (e.g., a 3GPP LTE standard). In another embodiment, the position of the gap subframe (G) within the uplink assignment is signaled by the cellular communications network 10 (e.g., signaled via RRC signaling from the base station 12 to the wireless device 14 or included in the multi-TTI uplink assignment). Additionally, in some embodiments, one or more rules may be defined such that the position and/or presence of the gap subframe (G) depend on one or more criteria. For example, a rule may be defined that states that the gap subframe (G) is not present if the number (m) of subframes in the corresponding uplink assignment is less than a threshold (or conversely is present if the number (m) of subframes in the corresponding uplink assignment is greater than or equal to a threshold). This threshold may be, for example, the uplink scheduling delay (g) or the relative position (d) of the gap subframe (G) (if present) from the end of the corresponding uplink assignment. As another example, a rule may be defined that states that the gap subframe (G) is not present if a fixed downlink subframe that can be used to transmit a new uplink grant falls within the corresponding uplink assignment and, in some embodiments, has a position that satisfies one or more defined criteria (e.g., position relative to the end of the corresponding uplink assignment is greater than or equal to the uplink scheduling delay (g)).

Figure 8A:
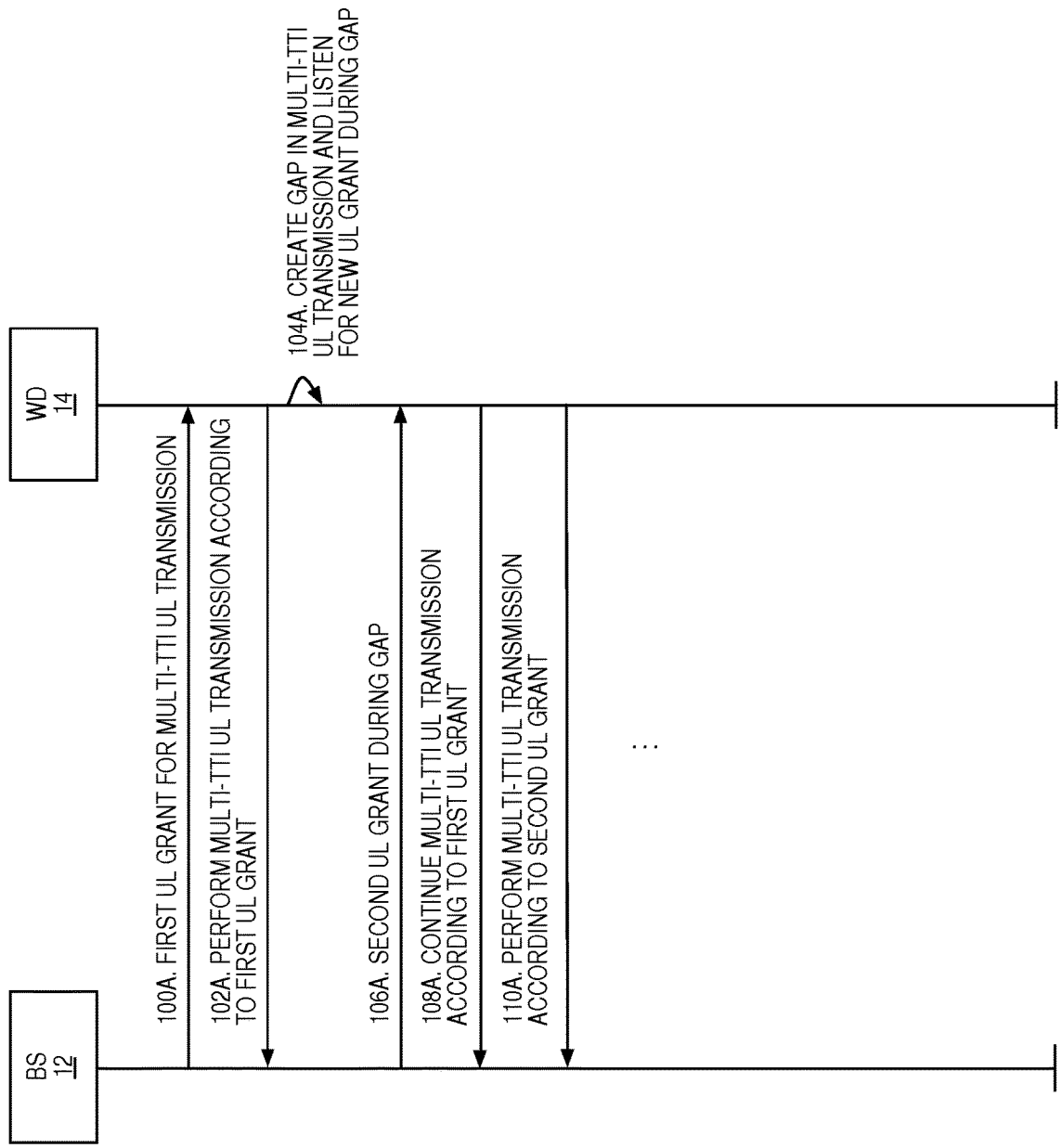
FIGS. 8A and 8B illustrate the operation of the base station and the wireless device of FIG. 6 according to one embodiment of the present disclosure.
Figure 8B:
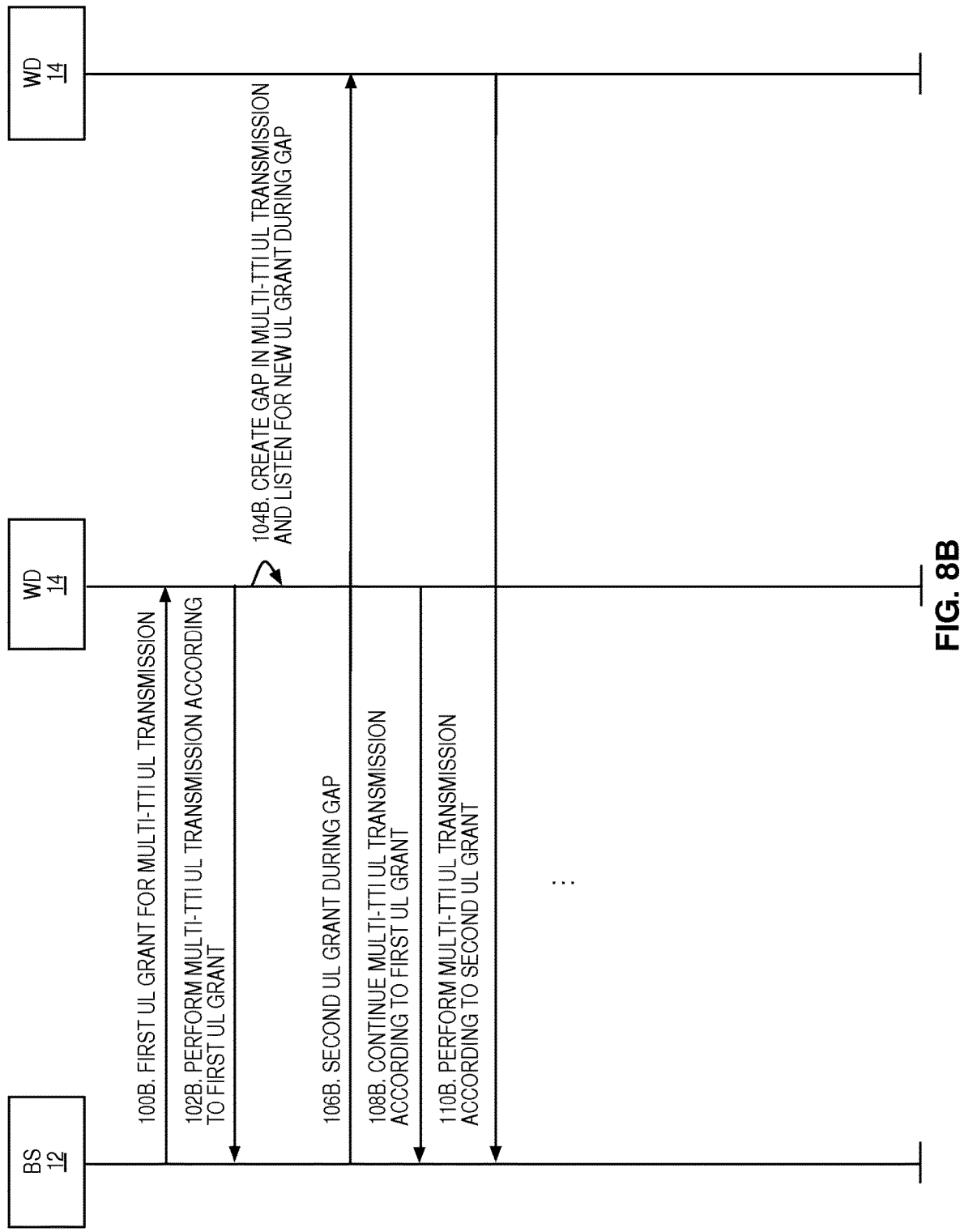

FIGS. 8A and 8B illustrates the operation of the base station 12 and the wireless device 14 according to one embodiment of the present disclosure. In FIG. 8A, the first uplink grant and the new uplink grant during the gap are for the same wireless device 14. As illustrated in FIG. 8A, the base station 12 transmits a first multi-TTI uplink grant to the wireless device 14 in a downlink subframe (step 100A). Notably, a multi-TTI uplink grant is also referred to herein as an uplink grant for a multi-TTI uplink transmission. The multi-TTI uplink grant assigns multiple (m) consecutive uplink subframes for a first uplink transmission by the wireless device 14. In response, the wireless device 14 performs the first uplink transmission according to the first multi-TTI uplink grant (step 102A). During the first uplink transmission, the wireless device 14 creates a gap subframe within multiple (m) consecutive uplink subframes assigned for the first uplink transmission during which the wireless device 14 listens for a downlink including a new uplink grant for the wireless device 14 (step 104A). As discussed above, the position of the gap subframe may be predefined (e.g., by a standard) or signaled to the wireless device 14 (e.g., via RRC signaling).

During the gap subframe, the base station 12 transmits and the wireless device 14 receives a new, or second, multi-TTI uplink assignment for the wireless device 14 (step 106A). The wireless device 14 then continues the first uplink transmission according to the first multi-TTI uplink grant (step 108A). Notably, in one embodiment, the wireless device 14 transmits a total of m uplink subframes, not including the gap subframe. In another embodiment, the wireless device transmits in m−1 uplink subframes (i.e., the downlink subframe is counted toward the m consecutive subframes assigned by the first multi-TTI uplink grant). In the same manner, any fixed downlink subframe(s) that occur within the uplink assignment may or may not be counted toward the m subframes scheduled for the first uplink transmission.

After completing the first uplink transmission on the multiple (m) consecutive uplink subframes assigned by the first multi-TTI uplink grant, the wireless device 14 performs a second uplink transmission according to the second multi-TTI uplink grant (step 110A). As discussed above, in one embodiment, the position of the gap subframe within the multiple (m) consecutive subframes assigned by the first multi-TTI uplink grant is such that an amount of time or subframes between the gap subframe and the end of the multiple (m) consecutive subframes assigned by the first multi-TTI uplink grant is greater than or equal to the uplink scheduling delay (g). As a result, the second uplink transmission can be scheduled to begin in the subframe immediately following the end of the first uplink transmission. In this manner, usage of radio resources for uplink transmission is maximized.

In the embodiment of FIG. 8B, the first uplink grant and the new uplink grant during the gap are for different wireless devices 14. As illustrated in FIG. 8B, the base station 12 transmits a first multi-TTI uplink grant to a first wireless device 14 in a downlink subframe (step 100B). Notably, a multi-TTI uplink grant is also referred to herein as an uplink grant for a multi-TTI uplink transmission. The multi-TTI uplink grant assigns multiple (m) consecutive uplink subframes for a first uplink transmission by the first wireless device 14. In response, the first wireless device 14 performs the first uplink transmission according to the first multi-TTI uplink grant (step 102B). During the first uplink transmission, the first wireless device 14 creates a gap subframe within multiple (m) consecutive uplink subframes assigned for the first uplink transmission during which the first wireless device 14 listens for a downlink including a new uplink grant for the wireless device 14 (step 104B). As discussed above, the position of the gap subframe may be predefined (e.g., by a standard) or signaled to the wireless device 14 (e.g., via RRC signaling).

During the gap subframe, the base station 12 transmits a new, or second, multi-TTI uplink grant for a second wireless device 14, and the second wireless device 14 receives the second multi-TTI uplink grant (step 106B). After the gap subframe, the first wireless device 14 then continues the first uplink transmission according to the first multi-TTI uplink grant (step 108B). Notably, in one embodiment, the first wireless device 14 transmits a total of m uplink subframes, not including the gap subframe. In another embodiment, the first wireless device 14 transmits in m−1 uplink subframes (i.e., the downlink subframe is counted toward the m consecutive subframes assigned by the first multi-TTI uplink grant). In the same manner, any fixed downlink subframe(s) that occur within the uplink assignment may or may not be counted toward the m subframes scheduled for the first uplink transmission.

In response to the second uplink grant, the second wireless device 14 performs an uplink transmission according to the second multi-TTI uplink grant (step 110B). As discussed above, in one embodiment, the position of the gap subframe within the multiple (m) consecutive subframes assigned by the first multi-TTI uplink grant is such that an amount of time or subframes between the gap subframe and the end of the multiple (m) consecutive subframes assigned by the first multi-TTI uplink grant is greater than or equal to the uplink scheduling delay (g). As a result, the second uplink transmission can be scheduled to begin in the subframe immediately following the end of the first uplink transmission. In this manner, usage of radio resources for uplink transmission is maximized.

Figure 9:
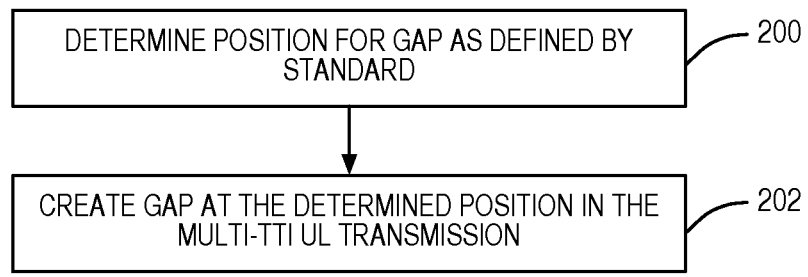
FIG. 9 illustrates a process by which the wireless device of FIG. 6 creates a gap subframe at a position defined by a corresponding cellular communications network standard according to one embodiment of the present disclosure.

As discussed above, the position of the gap subframe can be defined or determined in any suitable manner. FIG. 9 illustrates a process by which the wireless device 14 creates the gap subframe at a position defined by a corresponding cellular communications network standard according to one embodiment of the present disclosure. As illustrated, the wireless device 14 determines the position of the gap subframe as defined by the standard (step 200). In one example, the standard defines the position of the gap subframe relative to the end of the corresponding uplink assignment, e.g., d subframes from an end of the multiple (m) consecutive subframes assigned by the multi-TTI uplink grant as discussed above. Further, the position and/or presence of the gap subframe may be further defined by the standard based on one or more rules, as discussed above. The wireless device 14 then creates the gap subframe within the uplink transmission for the multi-TTI uplink grant (step 202). The wireless device 14 creates the gap subframe by utilizing the gap subframe as a downlink subframe during which the wireless device 14 listens for a new uplink grant.

Figure 10:
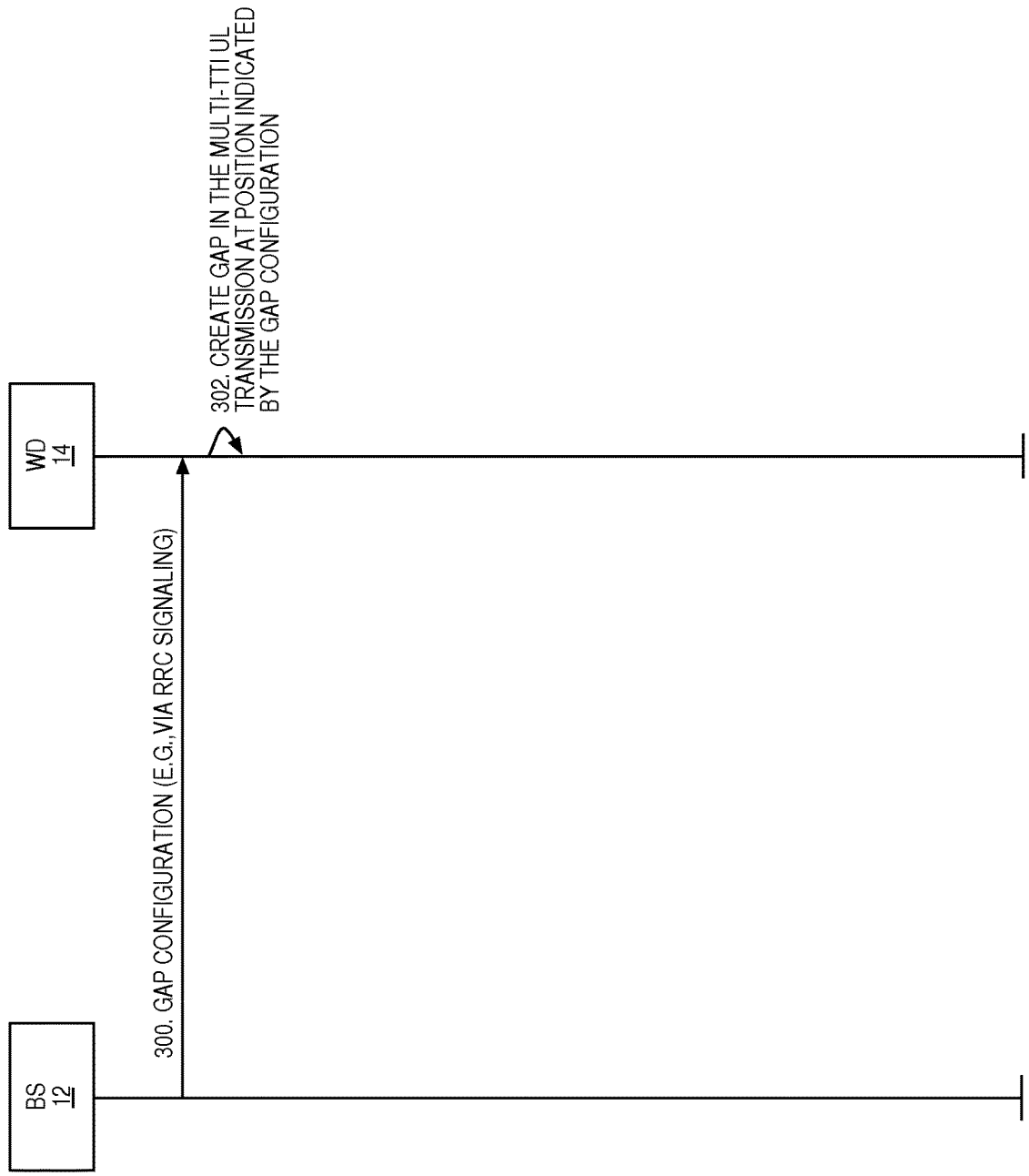
FIG. 10 illustrates a process by which the wireless device of FIG. 6 creates a gap subframe at a position configured by the cellular communications network according to one embodiment of the present disclosure.

FIG. 10 illustrates a process by which the wireless device 14 creates the gap subframe at a position configured by the cellular communications network 10 according to one embodiment of the present disclosure. As illustrated, in this embodiment, the base station 12 signals a gap configuration to the wireless device 14 via, e.g., RRC signaling (step 300). The gap configuration may be broadcast to multiple wireless devices 14 or transmitted individually to the wireless device 14. In this manner, the gap subframe can be, e.g., semi-statically configured. The gap configuration includes an indication that the gap subframe is to be used and/or the position of the gap subframe within uplink assignments for multi-TTI uplink grants. The wireless device 14 then creates the gap subframe during the uplink transmission for a multi-TTI uplink grant, as discussed above (step 302). Note that, while not illustrated, the gap configuration is signaled to the wireless device 14 before the multi-TTI uplink grant is transmitted to the wireless device 14. Further, in one embodiment, the gap configuration applies to multiple (e.g., all) multi-TTI uplink grants (e.g., all multi-TTI uplink grants or all multi-TTI uplink grants that satisfy one or more rules, e.g., m>d).

Figure 11A:
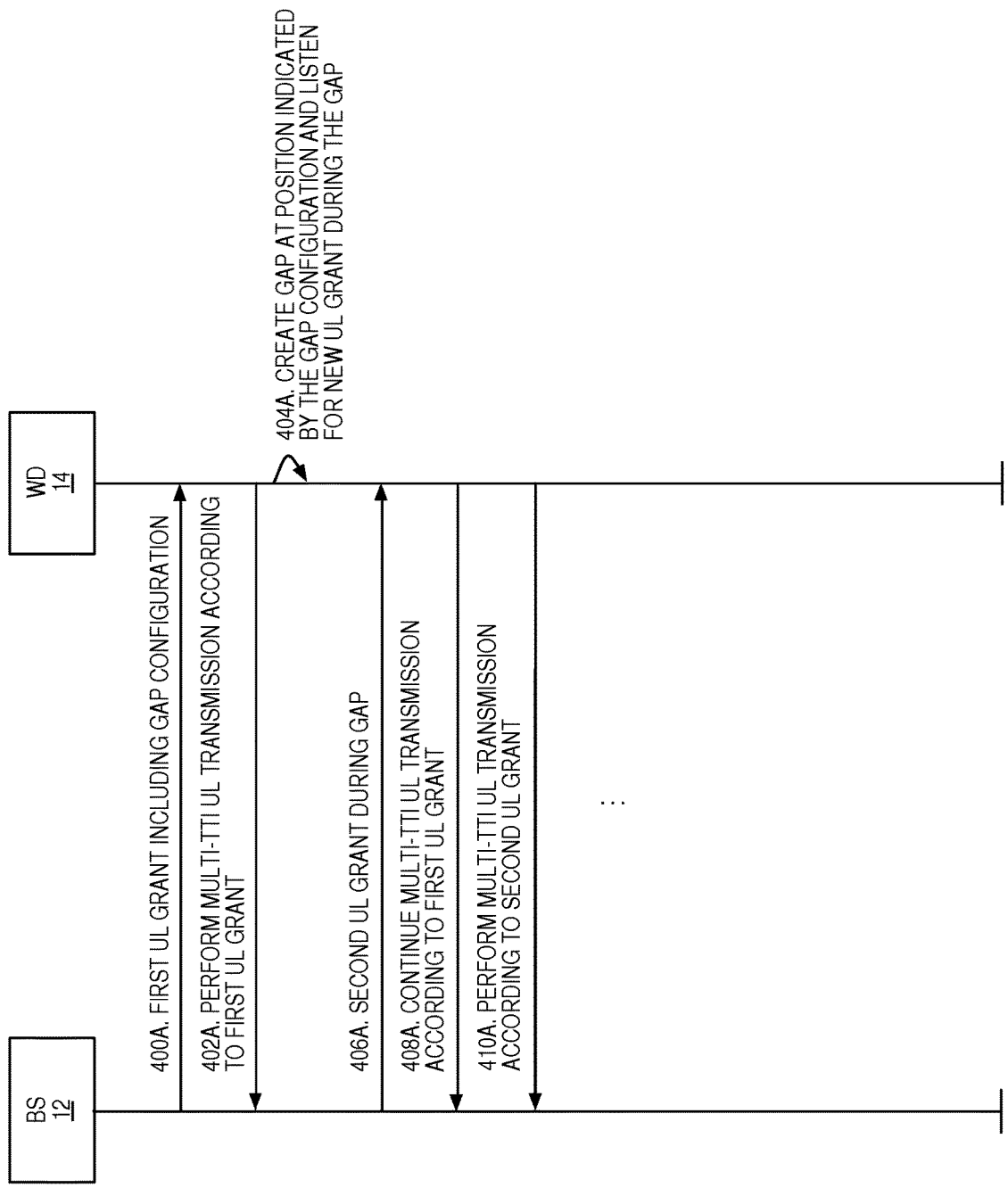
FIGS. 11A and 11B illustrate the operation of the base station and the wireless device of FIG. 6 according to one embodiment in which a gap subframe is configured dynamically in a multi-TTI uplink grant.
Figure 11B:
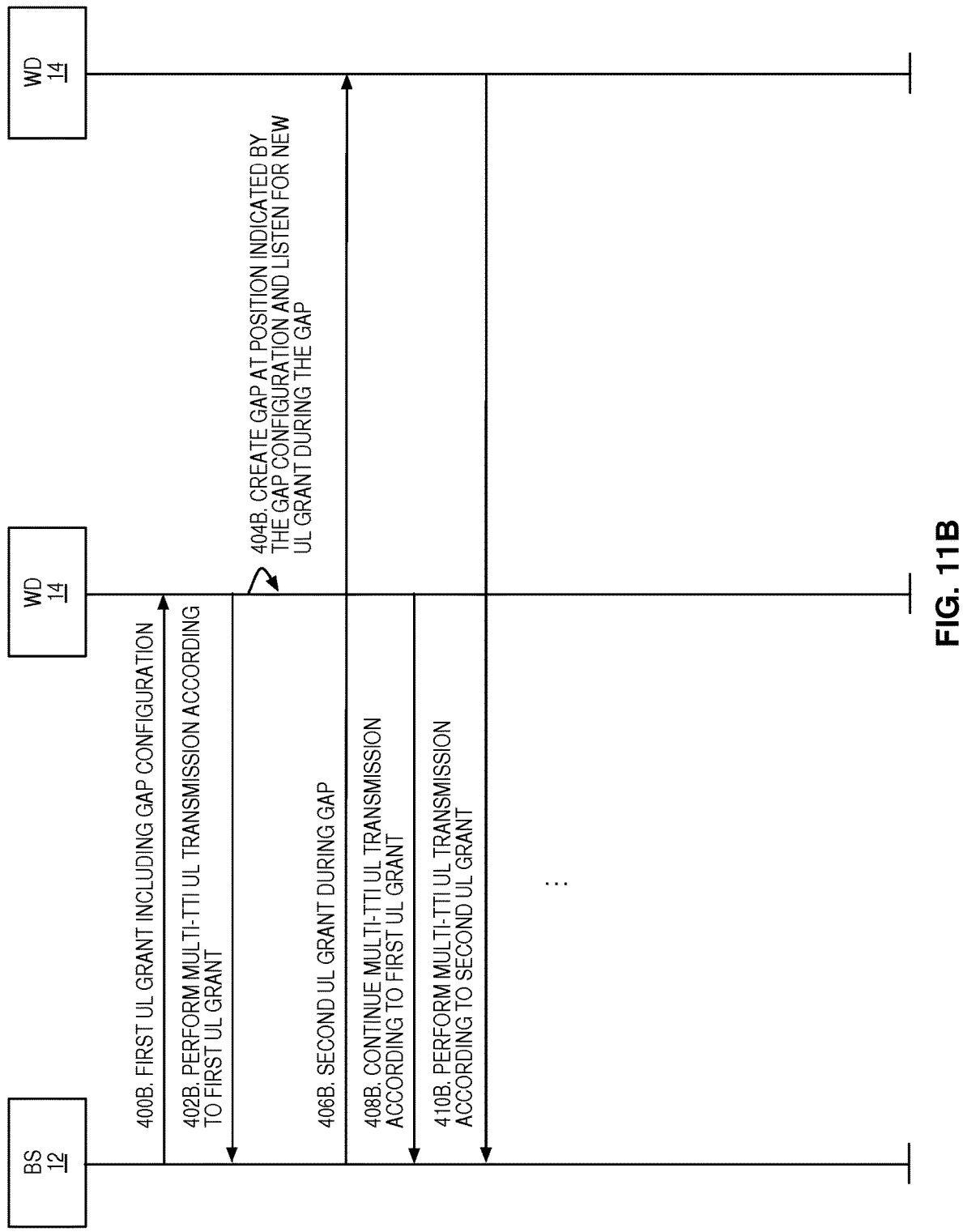

FIGS. 11A and 11B illustrate the operation of the base station 12 and the wireless device 14 where the gap subframe is configured dynamically in the multi-TTI uplink grant according to another embodiment of the present disclosure. In FIG. 11A, the first uplink grant and the second uplink grant are for the same wireless device 14. More specifically, as illustrated, the base station 12 transmits a first multi-TTI uplink grant to the wireless device 14 in a downlink subframe, where the first multi-TTI uplink grant includes a gap configuration (step 400A). The multi-TTI uplink grant assigns multiple (m) consecutive uplink subframes for a first uplink transmission by the wireless device 14. The gap configuration configures a presence of a gap subframe within the multiple (m) consecutive subframes scheduled by the first multi-TTI uplink grant (i.e., whether a gap subframe is to be created/present or not) and/or a position of the gap subframe within the multiple (m) consecutive uplink subframes assigned by the first multi-TTI uplink grant. In one embodiment, the gap configuration is included in a downlink gap subframe control message included in the first multi-TTI uplink grant.

The wireless device 14 then performs the first uplink transmission according to the first multi-TTI uplink grant (step 402A). During the first uplink transmission, the wireless device 14 creates a gap subframe, as configured by the gap configuration, within the multiple (m) consecutive uplink subframes assigned for the first uplink transmission during which the wireless device 14 listens for a downlink including a new uplink grant for the wireless device 14 (step 404A). In one embodiment, the position of the gap subframe is indicated in the gap configuration. In another embodiment, the gap configuration indicates that the gap subframe is to be used, but the position of the gap subframe is otherwise defined (e.g., defined by a standard or RRC signaling). Further, the use of the gap subframe may be conditioned on one or more additional rules. For example, the gap configuration may be ignored by the wireless device 14 (i.e., the gap subframe is not created) if, e.g., the position of the gap subframe is prior to a beginning, or start, of the multiple (m) consecutive uplink subframes scheduled by the multi-TTI uplink grant (e.g., if d>m).

During the gap subframe, the base station 12 transmits and the wireless device 14 receives a new, or second, multi-TTI uplink assignment for the wireless device 14 (step 406A). The second multi-TTI uplink grant may include a gap configuration for a corresponding uplink assignment. The wireless device 14 then continues the first uplink transmission according to the first multi-TTI uplink grant (step 408A). Again, note that in one embodiment the wireless device 14 transmits a total of m uplink subframes in the first uplink transmission, not including the gap subframe. In another embodiment, the wireless device 14 transmits in m−1 uplink subframes in the first uplink transmission (i.e., the gap subframe is counted toward the m subframes assigned by the first multi-TTI uplink grant). In the same manner, any fixed downlink subframe(s) that occur within the uplink assignment may or may not be counted toward the m subframes scheduled for the first uplink transmission.

After completing the first uplink transmission on the multiple (m) consecutive uplink subframes assigned by the first multi-TTI uplink grant, the wireless device 14 performs a second uplink transmission according to the second multi-TTI uplink grant (step 410A). As discussed above, in one embodiment, the position of the gap subframe within the multiple (m) consecutive subframes assigned by the first multi-TTI uplink grant is such that an amount of time or subframes between the gap subframe and the end of the multiple (m) consecutive subframes assigned by the first multi-TTI uplink grant is greater than or equal to the uplink scheduling delay (g). As a result, the second uplink transmission can be scheduled to begin in the subframe immediately following the end of the first uplink transmission. In this manner, usage of radio resources for uplink transmission is maximized.

In FIG. 11B, the first uplink grant and the second uplink grant are for different wireless devices 14. More specifically, as illustrated, the base station 12 transmits a first multi-TTI uplink grant to a first wireless device 14 in a downlink subframe, where the first multi-TTI uplink grant includes a gap configuration (step 400B). The multi-TTI uplink grant assigns multiple (m) consecutive uplink subframes for a first uplink transmission by the first wireless device 14. The gap configuration configures a presence of a gap subframe within the multiple (m) consecutive subframes scheduled by the first multi-TTI uplink grant (i.e., whether a gap subframe is to be created/present or not) and/or a position of the gap subframe within the multiple (m) consecutive uplink subframes assigned by the first multi-TTI uplink grant. In one embodiment, the gap configuration is included in a downlink gap subframe control message included in the first multi-TTI uplink grant.

The first wireless device 14 then performs the first uplink transmission according to the first multi-TTI uplink grant (step 402B). During the first uplink transmission, the first wireless device 14 creates a gap subframe, as configured by the gap configuration, within the multiple (m) consecutive uplink subframes assigned for the first uplink transmission during which the first wireless device 14 listens for a downlink including a new uplink grant for the first wireless device 14 (step 404B). In one embodiment, the position of the gap subframe is indicated in the gap configuration. In another embodiment, the gap configuration indicates that the gap subframe is to be used, but the position of the gap subframe is otherwise defined (e.g., defined by a standard or RRC signaling). Further, the use of the gap subframe may be conditioned on one or more additional rules. For example, the gap configuration may be ignored by the first wireless device 14 (i.e., the gap subframe is not created) if, e.g., the position of the gap subframe is prior to a beginning, or start, of the multiple (m) consecutive uplink subframes scheduled by the multi-TTI uplink grant (e.g., if d>m).

During the gap subframe, the base station 12 transmits a new, or second, multi-TTI uplink grant for a second wireless device 14, and the second wireless device 14 receives the second multi-TTI uplink grant (step 406B). The second multi-TTI uplink grant may include a gap configuration for a corresponding uplink assignment. After the gap, the first wireless device 14 then continues the first uplink transmission according to the first multi-TTI uplink grant (step 408B). Again, note that in one embodiment the first wireless device 14 transmits a total of m uplink subframes in the first uplink transmission, not including the gap subframe. In another embodiment, the first wireless device 14 transmits in m−1 uplink subframes in the first uplink transmission (i.e., the gap subframe is counted toward the m subframes assigned by the first multi-TTI uplink grant). In the same manner, any fixed downlink subframe(s) that occur within the uplink assignment may or may not be counted toward the m subframes scheduled for the first uplink transmission.

In response to receiving the second uplink grant, the second wireless device 14 performs a second uplink transmission according to the second multi-TTI uplink grant (step 410B). As discussed above, in one embodiment, the position of the gap subframe within the multiple (m) consecutive subframes assigned by the first multi-TTI uplink grant is such that an amount of time or subframes between the gap subframe and the end of the multiple (m) consecutive subframes assigned by the first multi-TTI uplink grant is greater than or equal to the uplink scheduling delay (g). As a result, the second uplink transmission can be scheduled to begin in the subframe immediately following the end of the first uplink transmission. In this manner, usage of radio resources for uplink transmission is maximized.

Figure 12:
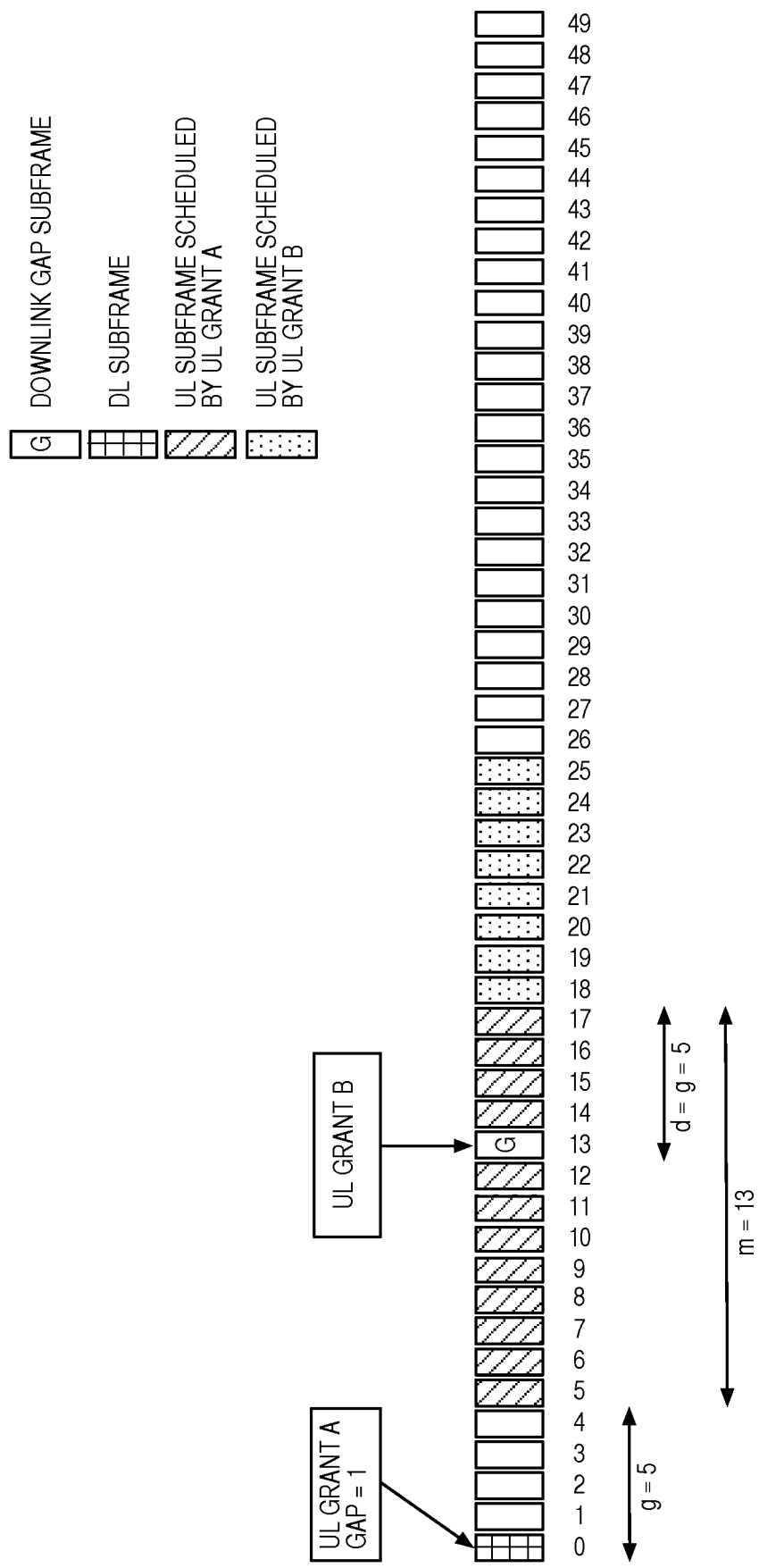
FIG. 12 illustrates one example in which a gap subframe is configured in a multi-TTI uplink grant according to the process of FIG. 11.

FIG. 12 illustrates one example in which a gap subframe is configured in a multi-TTI uplink grant according to the process of FIG. 11. As illustrated, a first multi-TTI uplink grant (uplink grant A) is transmitted to the wireless device 14 in the downlink during subframe A. Uplink grant A includes a gap indicator ("Gap") that is set to a value of "1" to thereby indicate that a gap subframe is to be created during the multiple (m) consecutive uplink subframes scheduled by uplink grant A. In this example, uplink grant A schedules subframes 5-17 as uplink subframes (i.e., m=13). Further, the position of the gap subframe, in this example, is defined as d=g, where g=5. The position of the gap subframe may also be indicated in uplink grant A or may be otherwise defined (e.g., by a standard or RRC signaling). In response to uplink grant A, the wireless device 14 performs uplink transmission in subframes 5-12, creates a gap subframe at subframe 13 for reception of a new uplink grant (uplink grant B), and continues uplink transmission in subframes 14-17. Notably, in this example, the gap subframe counts toward the multiple (m) consecutive uplink subframes scheduled by uplink grant A and, as such, the wireless device 14 performs uplink transmission in m−1 subframes. Uplink grant B schedules the next uplink transmission (for the same wireless device 14 or a different wireless device 14) starting at, in this example, subframe 18. As such, subframes between the two uplink transmissions that cannot be used for the uplink are avoided, which in turn maximizes the resources used for the uplink.

Figure 13A:
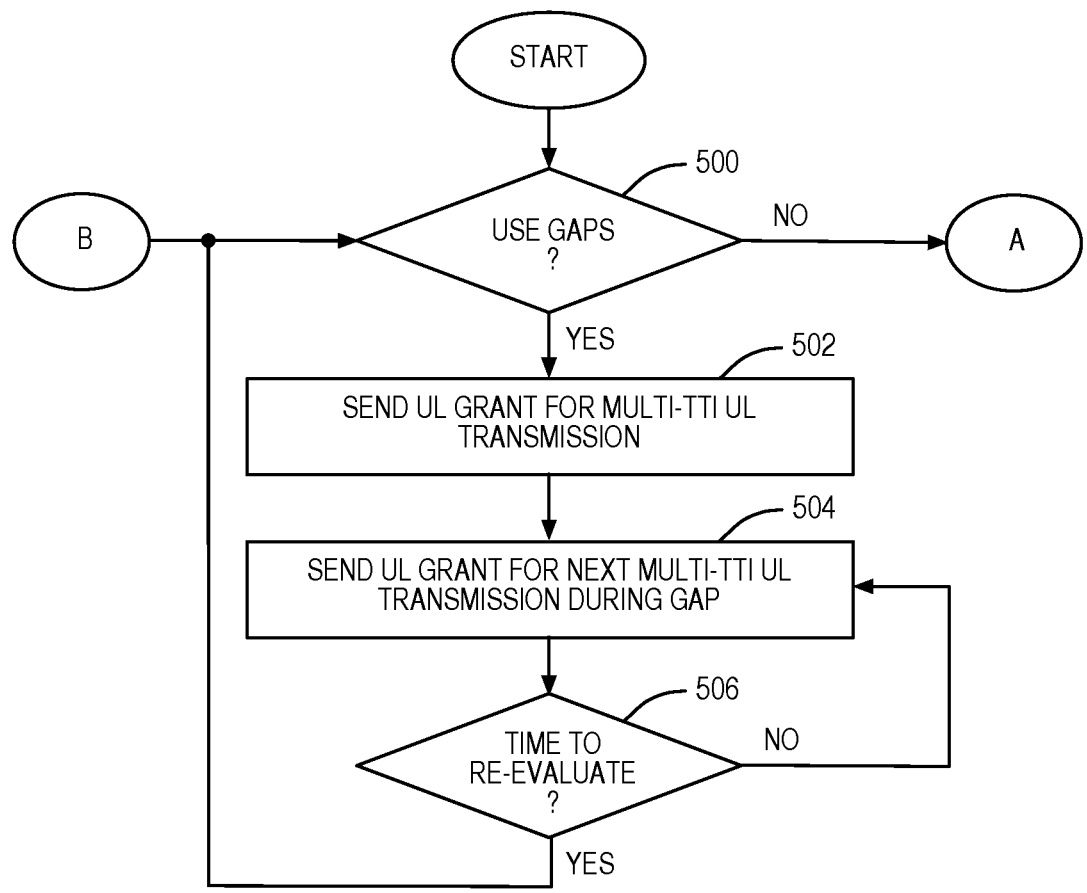
FIGS. 13A and 13B illustrate the operation of the base station to selectively use gap subframes according to one embodiment of the present disclosure.
Figure 13B:
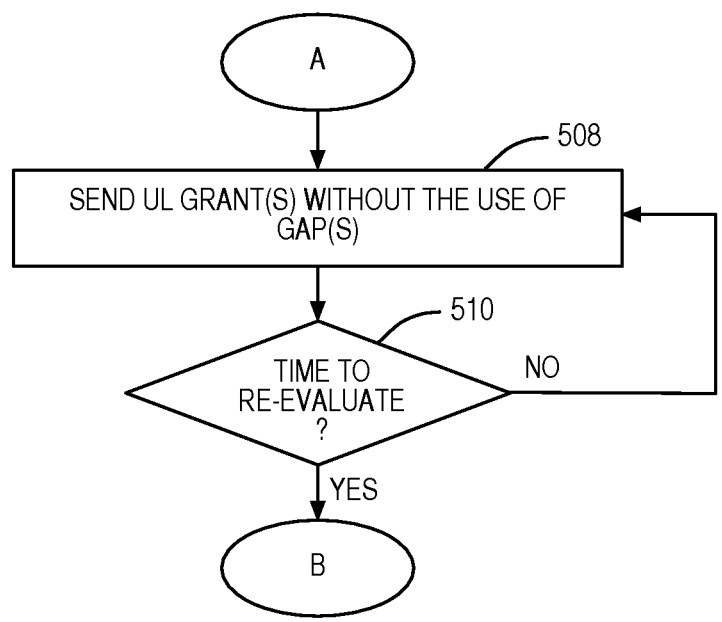

FIGS. 13A and 13B illustrate the operation of the base station 12 to selectively use gap subframes according to one embodiment of the present disclosure. A gap subframe will add more TDD switching at the base station 12 and the wireless device 14. Each TDD switching needs a guard period to switch from uplink to downlink and vice versa. System capacity can be reduced if there are many TDD switching events in a short period of time. As such, in one embodiment, gap subframes are only used when uplink traffic in the cell served by the base station 12 is heavy (and in some embodiments downlink traffic is light) and many consecutive uplink subframes are needed for uplink traffic.

More specifically, as illustrated, the base station 12 determines whether to use gap subframes (step 500). As discussed below, in one example, the base station 12 determines that gap subframes are to be used if uplink traffic is heavy and, in some embodiments, if downlink traffic is light. However, additional or alternative criteria may be used. If gap subframes are to be used, the base station 12 operates as described above. In particular, the base station 12 sends, or transmits, a multi-TTI uplink grant (step 502). The base station 12 then transmits a new uplink grant (e.g., a new multi-TTI uplink grant) for the same wireless device 14 or a different wireless device 14 in a gap subframe created in the multiple (m) consecutive uplink subframes scheduled by the multi-TTI uplink grant of step 502 (step 504). As discussed above, in one embodiment, the position of the gap subframe is defined by a standard. In another embodiment, the position of the gap subframe is determined by the network (e.g., by the base station 12) and signaled to the wireless device 14 by higher layer signaling (e.g., RRC signaling) or within the multi-TTI uplink grant of step 502.

In this example, the base station 12 then determines whether it is time to re-evaluate the decision to use gap subframes (step 506). For instance, the base station 12 may periodically re-evaluate the decision to use gap subframes (e.g., every N seconds). If it is not time to re-evaluate, the base station 12 returns to step 504 and sends the next uplink grant (e.g., the next multi-TTI uplink grant). Once it is time to re-evaluate, the process returns to step 500. Note that step 506 is just an example. For instance, in one alternative embodiment, the base station 12 determines whether a gap subframe is to be used prior to transmission of each multi-TTI uplink grant. This may be particularly beneficial if the gap configuration is included in the uplink grant.

Returning to step 500, if the base station 12 determines that gap subframes are not to be used, the base station 12 sends, or transmits, a multi-TTI uplink grant (or a single TTI uplink grant) (step 508). Note that if gap subframes are dynamically configured in the multi-TTI uplink grants, the multi-TTI uplink grant of step 508 may include an indication that that gap subframe is not to be used in the corresponding uplink assignment. In this example, the base station 12 then determines whether it is time to re-evaluate the decision to not use gap subframes (step 510). For instance, the base station 12 may periodically re-evaluate the decision as to whether to use gap subframes (e.g., every N seconds). If it is not time to re-evaluate, the base station 12 returns to step 508 and sends the next uplink grant. Once it is time to re-evaluate, the process returns to step 500. Note that step 510 is just an example. For instance, in one alternative embodiment, the base station 12 determines whether a gap subframe is to be used prior to transmission of each uplink grant. This may be particularly beneficial if the gap configuration is included in the uplink grant.

Figure 14:
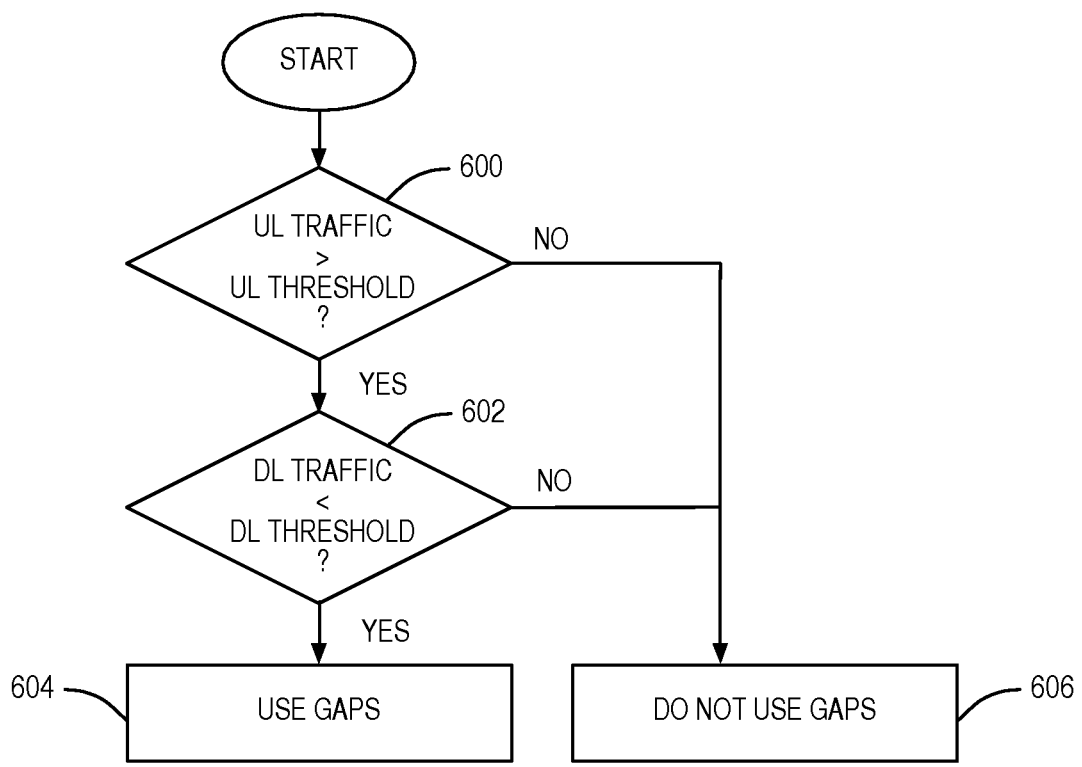
FIG. 14 illustrates a process by which the base station determines whether to use gaps based on an uplink traffic level according to one embodiment of the present disclosure.

FIG. 14 illustrates step 500 of FIG. 13A in more detail according to one embodiment of the present disclosure. In order to determine whether gap subframes are to be used, the base station 12 determines whether uplink traffic in the cell served by the base station 12 is greater than a predefined uplink threshold that is indicative of heavy uplink traffic (step 600). If so, the base station 12 determines whether downlink traffic in the cell served by the base station 12 is less than a predefined threshold that is indicative of low downlink traffic (step 602). If so, the base station 12 determines that gap subframes are to be used (step 604). Otherwise, if the uplink traffic is not greater than the uplink threshold or the downlink traffic is not less than the downlink threshold, then the base station 12 determines that gaps are not to be used (step 606). Note that, for the decisions in steps 600 and 602, the uplink traffic level and the downlink traffic level can be determined in any suitable manner. Techniques for doing so will be known to one of ordinary skill in the art upon reading this disclosure. However, in one embodiment, the uplink and downlink traffic levels are expressed as corresponding percentages of system resources utilized for the uplink and downlink, respectively, during a defined period of time.

Figure 15:
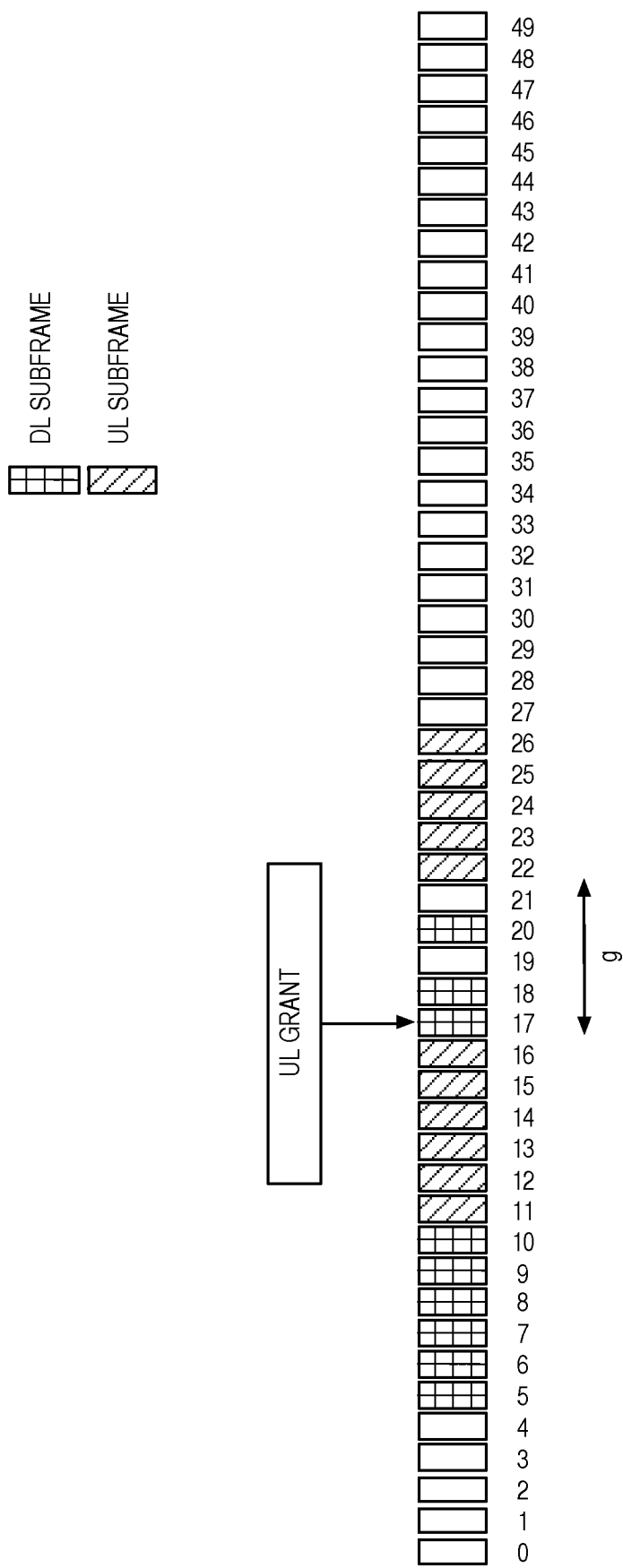
FIG. 15 illustrates one example in which a gap is not used for the next uplink grant when the uplink traffic level is not high according to one embodiment of the present disclosure.

FIG. 15 illustrates one example in which the uplink traffic is not heavy and, as a result, a gap subframe is not used. In this example, subframes 5-10 are downlink subframes. As a result of a previous multi-TTI uplink grant, the wireless device 14 transmits in the uplink during subframes 11-16. However, since uplink traffic is not heavy, no gap subframe is used. As such, a new uplink grant is not transmitted until after the end of the multiple (m) subframes scheduled by the previous multi-TTI uplink grant. In this particular example, the new uplink grant is transmitted in subframe 17, which is the subframe immediately following the end of the multiple (m) subframes scheduled by the previous uplink grant. The new uplink grant schedules the next uplink transmission starting at subframe 22.

In the embodiments described above, gap subframes are used for transmission (by the base station 12) and reception (by the wireless device 14) of a new uplink grant for the same or a different wireless device 14. However, in another embodiment, the new uplink grant may be transmitted in a fixed downlink subframe that occurs within the multiple (m) uplink subframes scheduled by the previous uplink grant. In this case, the base station 12 may determine that a gap subframe is not to be used in the corresponding uplink assignment. Conversely, the wireless device 14 may ignore, or not use, the gap subframe and, instead, use the gap subframe as an uplink subframe (or as a downlink subframe in which the wireless device 14 does not necessarily listen for a new uplink grant). However, in one embodiment, if the gap subframe is configured, the wireless device 14 listens for a new uplink grant (and possibly a downlink grant) in both the gap subframe and the fixed downlink subframe.

Figure 16A:
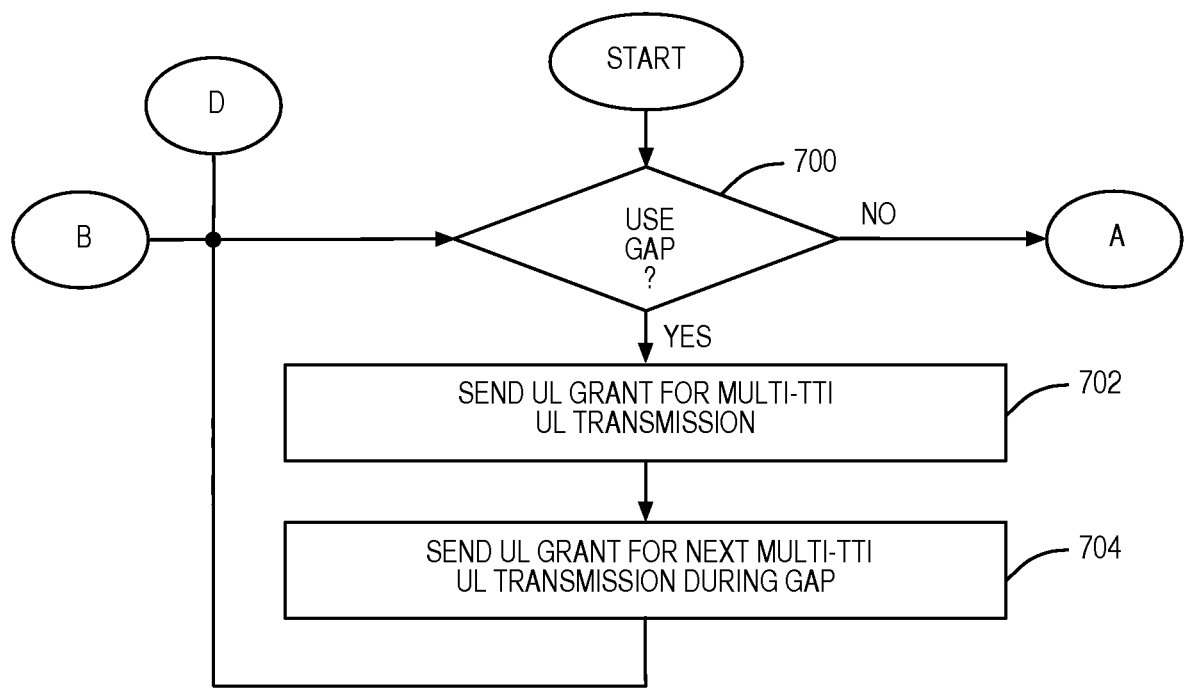
FIGS. 16A through 16C illustrate the operation of the base station to selectively use gap subframes according to another embodiment of the present disclosure.
Figure 16B:
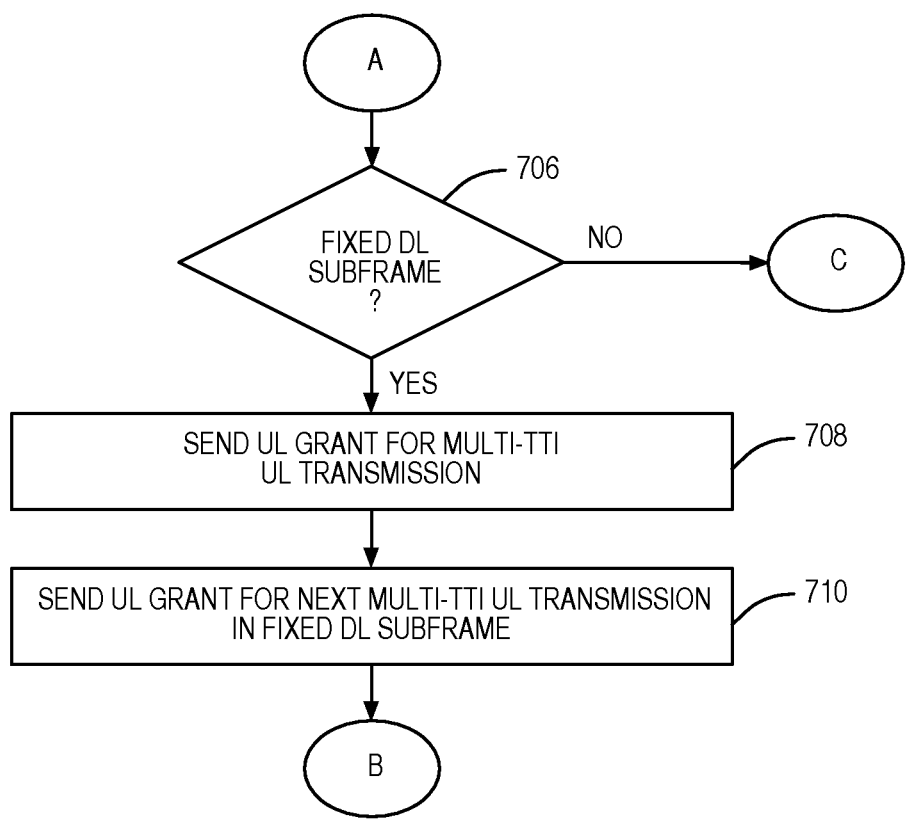
Figure 16C:
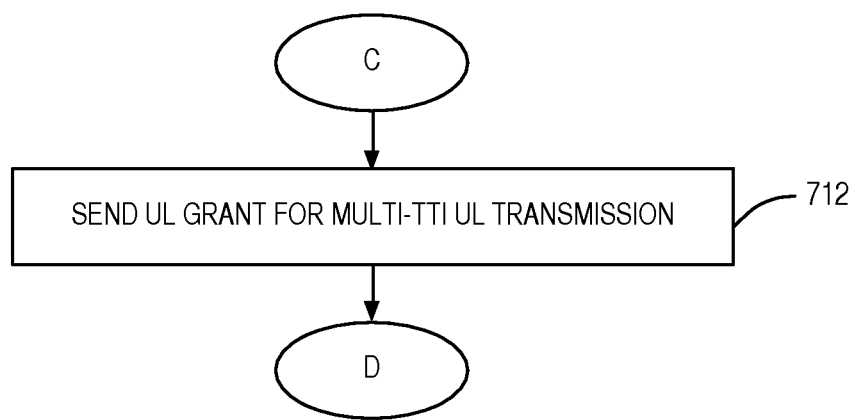

In this regard, FIGS. 16A through 16C illustrate the operation of the base station 12 to determine whether to use gap subframes based on the presence of a suitable fixed downlink subframe for transmission of a new uplink grant according to one embodiment of the present disclosure. As illustrated, the base station 12 determines whether to use a gap subframe (step 700). In this embodiment, the base station 12 determines that a gap subframe is to be used if there is no fixed downlink subframe in multiple (m) uplink subframes to be scheduled by an upcoming multi-TTI uplink grant. The fixed downlink subframe may be required to meet one or more conditions for being suitable for a new uplink grant such as, for example, d≥g. In addition, the base station 12 may consider one or more rules for determining whether to use a gap subframe (e.g., heavy uplink traffic condition).

If a gap subframe is to be used, the base station 12 operates as described above. In particular, the base station 12 sends, or transmits, a multi-TTI grant to a wireless device 14 to schedule the multiple (m) consecutive uplink subframes (step 702). In this embodiment, the multi-TTI uplink grant of step 702 preferably includes a gap configuration to indicate whether a gap subframe is to be used in a dynamic manner. The base station 12 then transmits a new uplink grant (e.g., a new multi-TTI uplink grant) for the same wireless device 14 or a different wireless device 14 in a gap subframe created in the multiple (m) consecutive uplink subframes scheduled by the multi-TTI uplink grant of step 702 (step 704). As discussed above, in one embodiment, the position of the gap subframe is defined by a standard. In another embodiment, the position of the gap subframe is determined by the network (e.g., by the base station 12) and signaled to the wireless device 14 by higher layer signaling (e.g., RRC signaling) or within the multi-TTI uplink grant of step 702. In this example, the base station 12 then returns to step 700.

Returning to step 700, if the base station 12 determines that a gap subframe is not to be used, the base station 12 determines whether a fixed downlink subframe is configured for the wireless device 14 within the multiple (m) consecutive subframes to be scheduled for the wireless device 14 (step 706). As discussed above, the fixed downlink subframe may be required to also satisfy one or more criteria for being suitable for a new uplink grant (e.g., d≥g). If there is a suitable fixed downlink subframe, the base station 12 sends, or transmits, a multi-TTI grant to the wireless device 14 to schedule the multiple (m) consecutive uplink subframes (step 708). The base station 12 then transmits a new uplink grant (e.g., a new multi-TTI uplink grant) for the same or different wireless device 14 in the fixed downlink subframe within the multiple (m) consecutive uplink subframes scheduled by the multi-TTI uplink grant of step 708 (step 710). The process then returns to step 700. Returning to step 706, if there is no suitable fixed downlink subframe, the base station 12 sends, or transmits, a multi-TTI uplink grant (or single TTI uplink grant) to the wireless device 14 (step 712). Any new uplink grant will thereafter be sent in a downlink subframe that occurs after (e.g., immediately after) the multiple (m) consecutive uplink subframes assigned by the multi-TTI uplink grant of step 712. After step 712, the process then returns to step 700.

Figure 17:
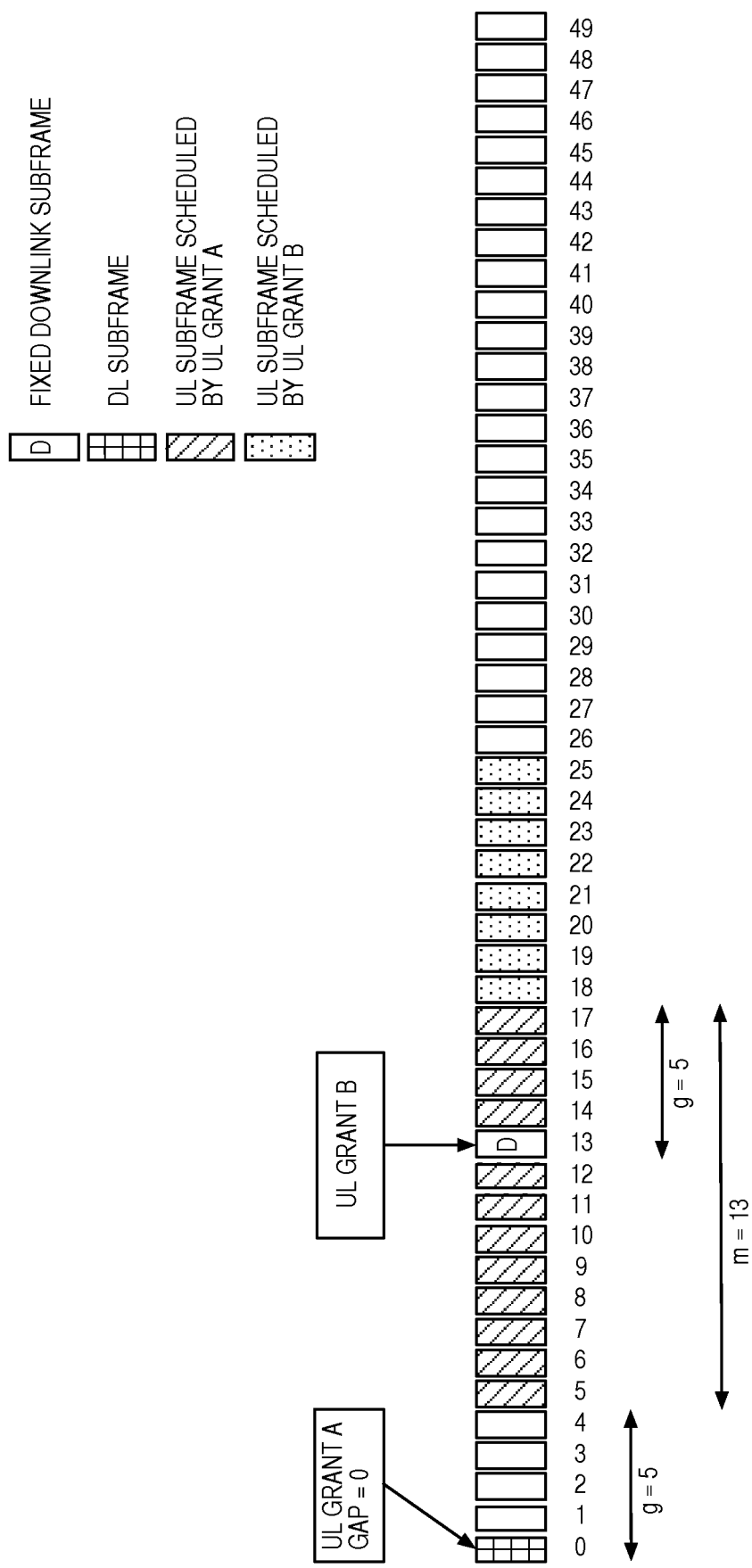
FIG. 17 illustrates one example of a new multi-TTI uplink grant transmitted in a fixed downlink subframe.

FIG. 17 illustrates one example of a new multi-TTI uplink grant transmitted in a fixed downlink subframe. In this example, a first multi-TTI uplink grant (uplink grant A) schedules a first uplink transmission for the wireless device 14 on subframes 5-17. In this example, subframe 13 is a fixed downlink subframe (D). As such, uplink grant A includes a gap configuration of Gap=0 to thereby indicate to the wireless device 14 that a gap subframe is not to be created. Rather, as either signaled by the network or otherwise defined (e.g., via a standard), a new multi-TTI uplink grant (uplink grant B) is to be transmitted by the base station 12 in the fixed downlink subframe, which again in this example is subframe 13. As such, during the first uplink transmission, the wireless device 14 stops uplink transmission and monitors the downlink in subframe 13 to thereby listen for uplink grant B. In this example, uplink grant B is a multi-TTI uplink grant for subframes 18-25. Note, however, that if the gap subframe is configured (i.e., in this example, Gap=1), then the wireless device 14 listens for a new uplink grant in both the gap subframe and the fixed downlink subframe.

Thus, in the embodiments of FIGS. 16A through 16C and FIG. 17, if a fixed downlink subframe is configured, the base station 12 can transmit a new uplink multi-TTI grant in the fixed downlink subframe. Alternatively, the base station 12 may transmit the new uplink multi-TTI grant in a gap subframe even if there is a fixed downlink subframe (e.g., when the fixed downlink subframe is not at an optimal or desired position in the uplink assignment). If the new multi-TTI uplink grant is transmitted in fixed downlink subframe, the gap subframe is optional. The use of the gap subframe, even when a fixed downlink subframe is used, can be controlled by a gap configuration (e.g., a downlink gap subframe control message) in the uplink grant. Note that a fixed downlink subframe can also be used as gap subframe if the positions of the gap subframe and the fixed subframe coincide.

Figure 18A:
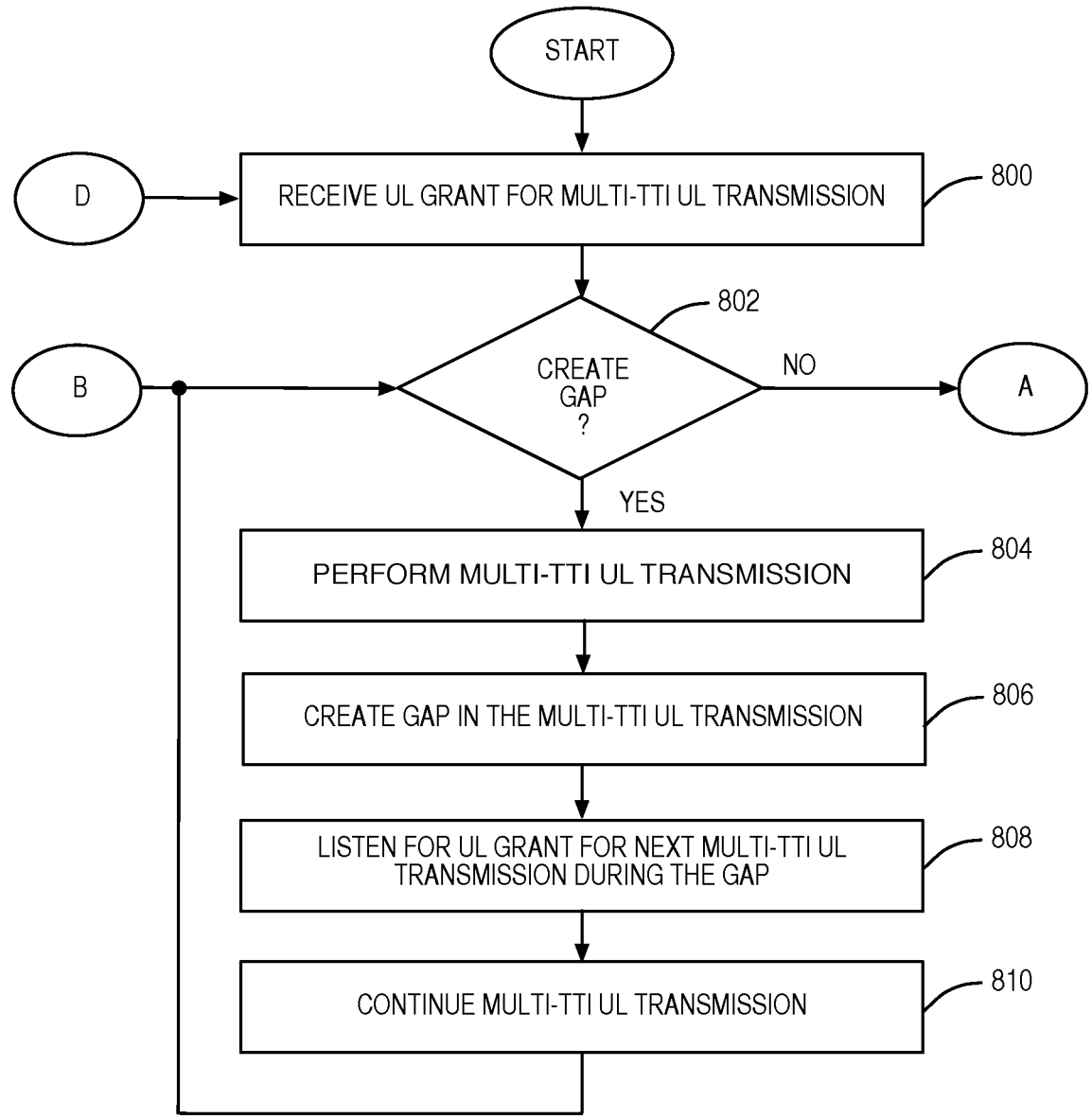
FIG. 18A through 18C illustrate the operation of the wireless device of FIG. 6 according to one embodiment of the present disclosure.
Figure 18B:
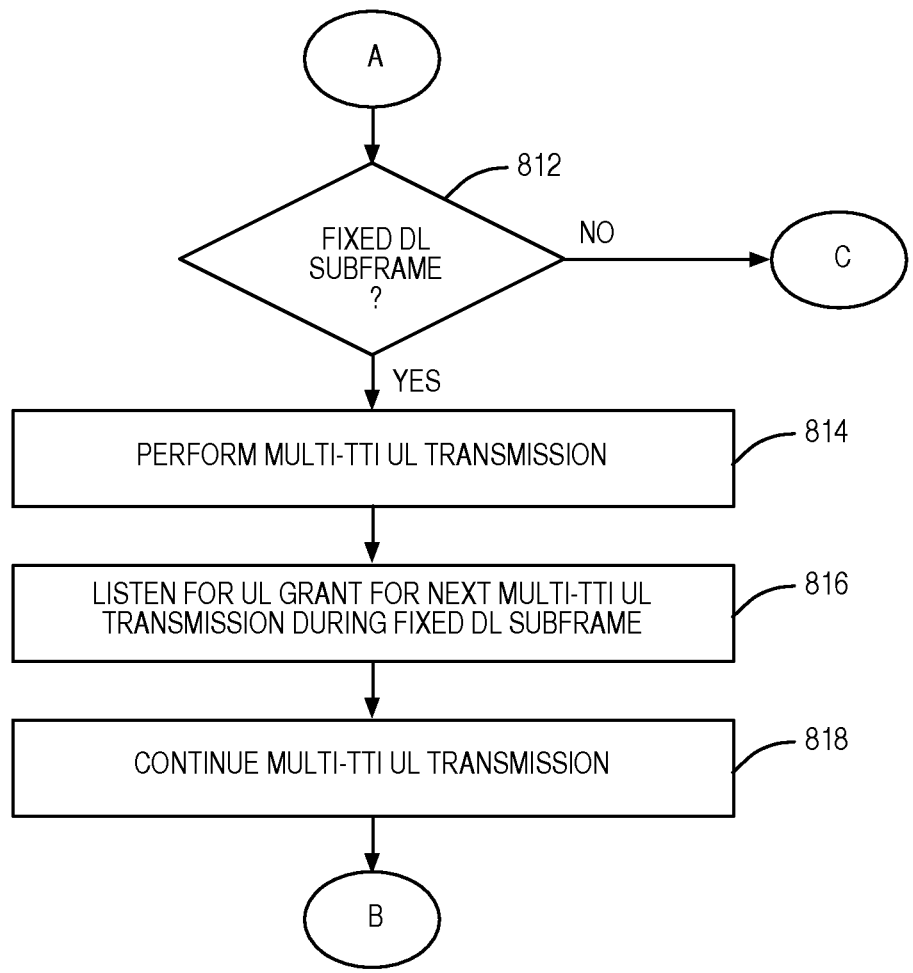
Figure 18C:
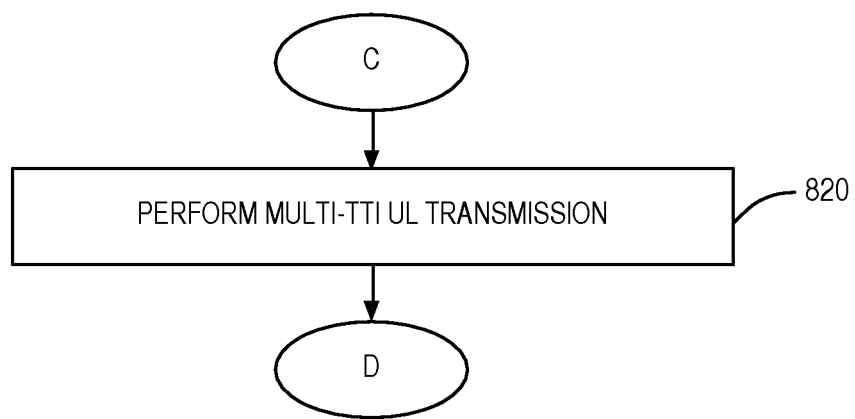

FIGS. 18A through 18C illustrate the operation of the wireless device 14 according to one embodiment of the present disclosure. This embodiment is similar to that of FIGS. 16A through 16C, but from the perspective of the wireless device 14. As illustrated, the wireless device 14 receives a multi-TTI uplink grant (step 800). The wireless device 14 determines whether a gap subframe is to be created in the multiple (m) consecutive uplink subframes scheduled by the multi-TTI uplink grant of step 800 (step 802). In one embodiment, the multi-TTI uplink grant of step 800 includes a gap configuration that indicates to the wireless device 14 whether a gap subframe is to be used and, in some embodiments, the position of the gap subframe. Further, even if the use of a gap subframe is configured, the wireless device 14 may further apply one or more criteria or rules to determine whether to ignore the gap subframe or not. For instance, the wireless device 14 may decide to ignore, or not create, the gap subframe if the position of the gap subframe is prior to the uplink assignment (e.g., if d>m).

If a gap subframe is to be created, the wireless device 14 operates as described above. In particular, the wireless device 14 performs uplink transmission on those uplink subframes scheduled by the multi-TTI uplink grant of step 800 prior to the position of the gap subframe (step 804). The wireless device 14 then creates the gap subframe at the desired position (step 806). During the gap subframe, the wireless device 14 listens for a new multi-TTI uplink grant from the base station 12 (step 808). The wireless device 14 may or may not receive a new multi-TTI uplink grant during the gap subframe. The wireless device 14 then continues uplink transmission on the remaining subframes of the multi-TTI uplink grant of step 800 (step 810). Once uplink transmission is complete, the process returns to step 802 and is repeated for the next uplink transmission.

Returning to step 802, if a gap subframe is not to be created, the wireless device 14 determines whether there is a fixed downlink subframe within the multiple (m) consecutive uplink subframes scheduled by the multi-TTI uplink grant of step 800 (step 812). The fixed downlink subframe may be required to meet one or more predefined criteria (e.g., d≥g). If there is a fixed downlink subframe, the wireless device 14 performs uplink transmission on those uplink subframes scheduled by the multi-TTI uplink grant of step 800 prior to the position of the fixed downlink subframe (step 814). The wireless device 14 then switches to downlink reception for the fixed downlink subframe, and listens for a new multi-TTI uplink grant from the base station 12 during the fixed downlink subframe (step 816). The wireless device 14 may or may not receive a new multi-TTI uplink grant during the fixed downlink subframe. The wireless device 14 then continues uplink transmission on the remaining subframes of the multi-TTI uplink grant of step 800 (step 818). Once uplink transmission is complete, the process returns to step 802 and is repeated for the next uplink transmission. Returning to step 812, if there is no fixed downlink subframe, the wireless device 14 performs uplink transmission on the multiple (m) uplink subframes scheduled by the multi-TTI uplink grant of step 800 (step 820). The process then returns to step 800 to receive the next uplink grant.

Figure 19:
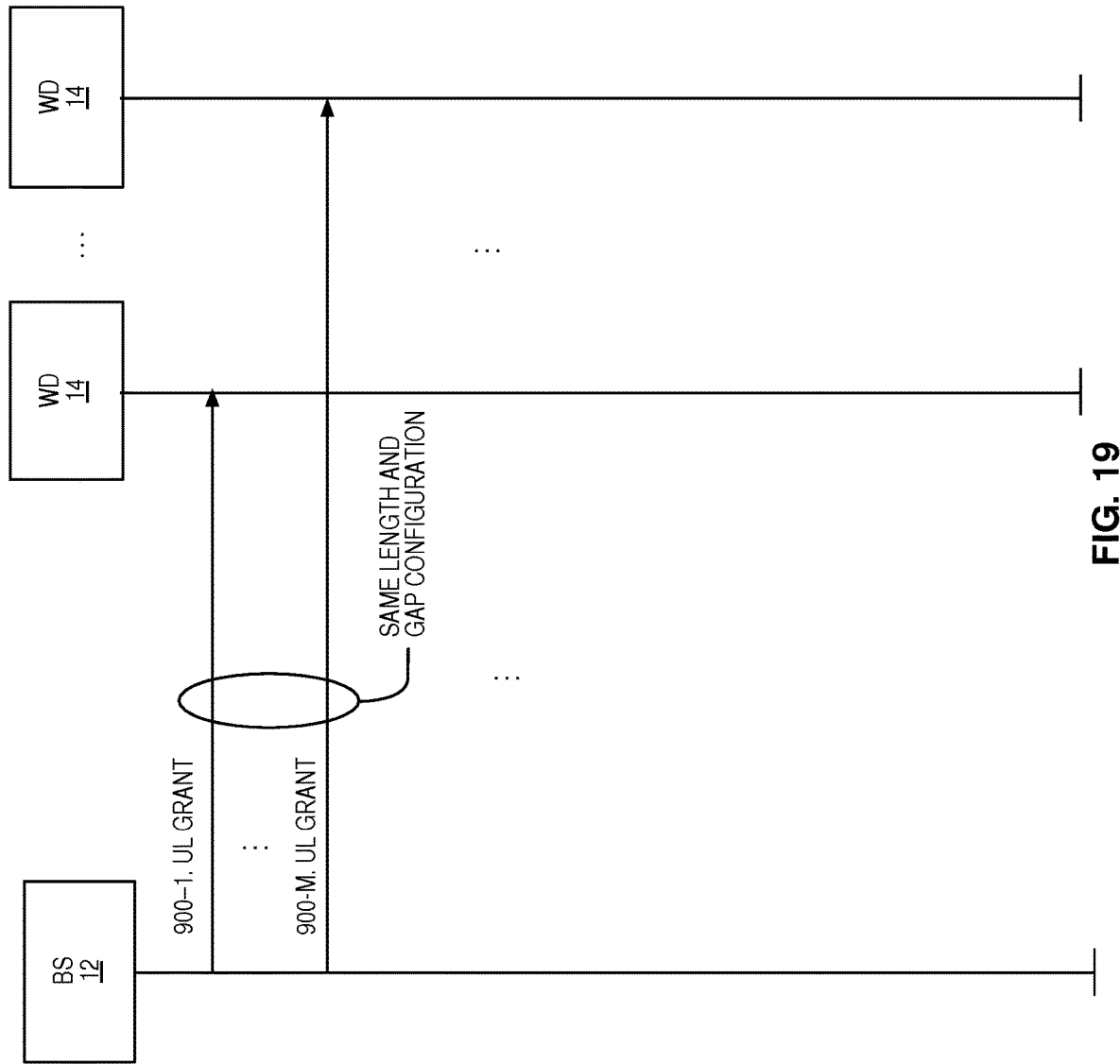
FIG. 19 illustrates the operation of the base station to schedule multiple wireless devices with the same length of consecutive uplink subframes and the same gap configuration according to one embodiment of the present disclosure.

FIG. 19 illustrates the operation of the base station 12 to schedule multiple wireless devices 14 with the same length of m consecutive uplink subframes and the same gap configuration according to one embodiment of the present disclosure. As illustrated, the base station 12 (and in particular a scheduler of the base station 12) sends, or transmits, multi-TTI uplink grants to multiple wireless devices 14 (steps 900-1 through 900-M). The multi-TTI uplink grants are such that the wireless devices 14 are scheduled for the same length (m) of consecutive subframes and the same gap configuration. As a result, all of the wireless devices 14 have an aligned subframe direction in the same cell. This may be particularly beneficial in a TDD system. If the wireless devices 14 have uplink data buffers of different sizes (i.e., they desire to transmit different amounts of uplink data), the scheduler of the base station 12 may, in one embodiment, ensure that scheduled bandwidths for the wireless devices 14 are adapted so that the amount of coded data to be transmitted is mapped to m subframes.

Figure 20:
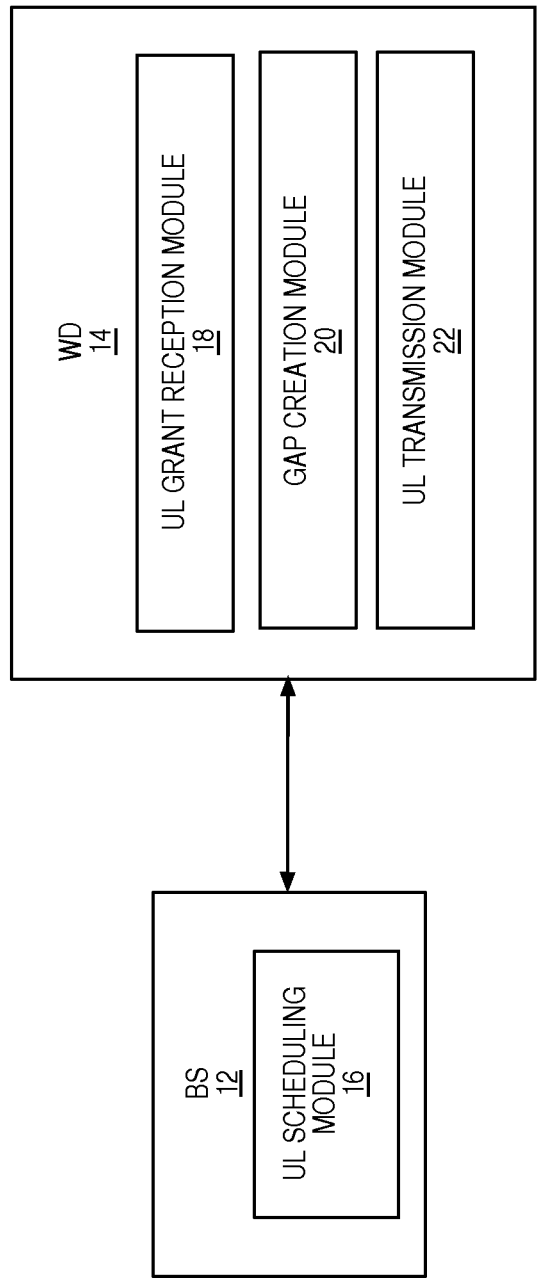
FIG. 20 is a functional block diagram of the base station and the wireless device of FIG. 6 according to one embodiment of the present disclosure.

FIG. 20 is a functional block diagram of the base station 12 and the wireless device 14 according to one embodiment of the present disclosure. As illustrated, the base station 12 includes an uplink scheduling module 16 that may be implemented in hardware, software (e.g., software stored in a computer readable medium such as a non-transistor computer readable medium (e.g., memory) and executed by one or more processors of the base station 12), or a combination thereof. The uplink scheduling module 16 operates to provide the functionality of the base station 12 according to any one of the embodiments described herein. Further, the uplink scheduling module 16 may include one or more sub-modules such as, e.g., a first module for transmitting a first uplink grant and a second module for transmitting a second uplink grant during a gap subframe created in the multiple (m) consecutive subframes assigned by the first uplink grant.

The wireless device 14 includes an uplink grant reception module 18, a gap creation module 20, and an uplink transmission module 22 that together operate to provide the functionality of the wireless device 14 according to any of the embodiments described herein. The uplink grant reception module 18, the gap creation module 20, and the uplink transmission module 22 may be implemented in hardware, software (e.g., software stored in a computer readable medium such as a non-transistor computer readable medium (e.g., memory) and executed by one or more processors of the wireless device 14), or a combination thereof. As an example, in one embodiment, the uplink grant reception module 18 operates to receive a first multi-TTI uplink grant (e.g., via a receiver of the wireless device 14). The uplink transmission module 22 then performs uplink transmission (e.g., via a transmitter of the wireless device 14) using the radio resources assigned by the first multi-TTI uplink grant. During uplink transmission, the gap creation module 20 creates a gap subframe during which the uplink grant reception module 18 receives a new uplink grant. The uplink transmission module 22 then completes the uplink transmission for the first multi-TTI uplink grant.

Figure 21:
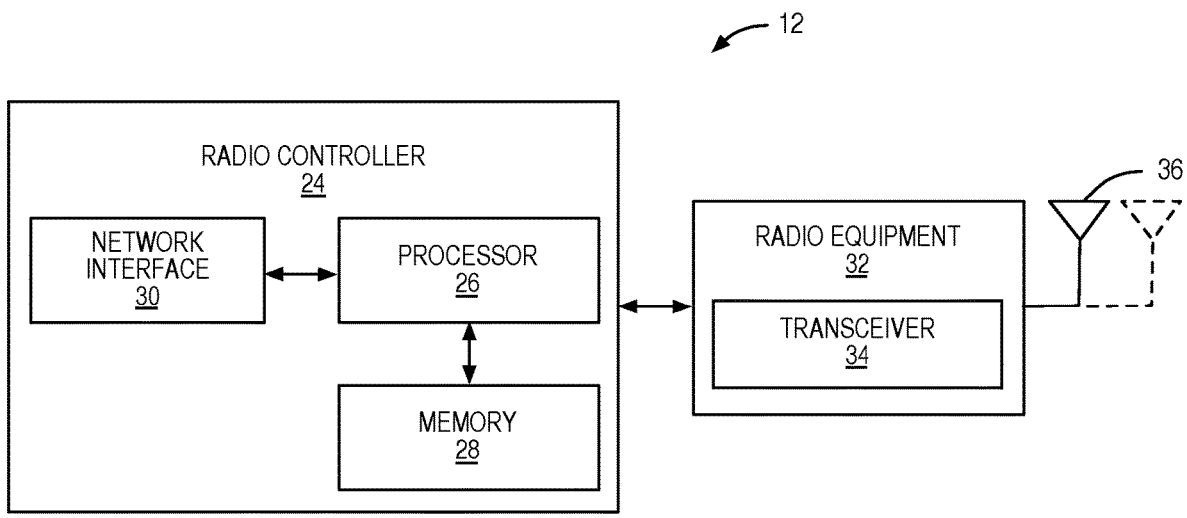
FIG. 21 is a block diagram of the base station of FIG. 6 according to one embodiment of the present disclosure.

FIG. 21 is a block diagram of the base station 12 according to one embodiment of the present disclosure. As illustrated, the base station 12 includes a radio controller 24 including a processor 26, memory 28, and a network interface 30 and radio equipment 32 including a transceiver 34 coupled to one or more antennas 36. In one embodiment, the functionality of the base station 12, according to any one of the embodiments described above, is implemented in software stored on a non-transitory computer readable medium (e.g., the memory 28) and executed by the processor 26. In one particular embodiment, the uplink scheduling module 16 of FIG. 20 is implemented in software stored in the memory 28 and executed by the processor 26.

In another embodiment, a computer program is provided that includes instructions which, when executed on at least one processor of the base station 12 (e.g., the processor 26), cause the at least one processor of the base station 12 to carry out any of the embodiments described herein. In another embodiment, a carrier containing the aforementioned computer program is provided, where the carrier is one of an electronic signal, an optical signal, a radio signal, or a computer readable storage medium (e.g., a non-transitory computer readable medium).

Figure 22:
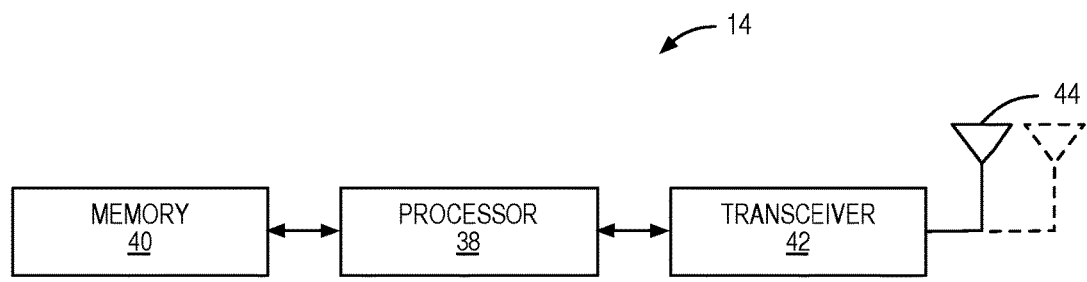
FIG. 22 is a block diagram of the wireless device of FIG. 6 according to one embodiment of the present disclosure.

FIG. 22 is a block diagram of the wireless device 14 according to one embodiment of the present disclosure. As illustrated, the wireless device 14 includes a processor 38, memory 40, and a transceiver 42 coupled to one or more antennas 44. In one embodiment, the functionality of the wireless device 14, according to any one of the embodiments described above, is implemented in software stored on a non-transitory computer readable medium (e.g., the memory 40) and executed by the processor 38. In one particular embodiment, the uplink grant reception module 18, the gap creation module 20, and the uplink transmission module 22 of FIG. 20 are implemented in software stored in the memory 40 and executed by the processor 38.

In another embodiment, a computer program is provided that includes instructions which, when executed on at least one processor of the wireless device 14 (e.g., the processor 38), cause the at least one processor of the wireless device 14 to carry out any of the embodiments described herein. In another embodiment, a carrier containing the aforementioned computer program is provided, where the carrier is one of an electronic signal, an optical signal, a radio signal, or a computer readable storage medium (e.g., a non-transitory computer readable medium).

While not being limited to any particular advantage(s), certain implementations of at least some of the embodiments described herein provide the following advantages. These advantages are only examples and are not intended to be an exhaustive list of all advantages of the embodiments described herein. In one embodiment, a control message included in the uplink grant provides a very small extra control signaling overhead and can dynamically allocate a gap subframe for new uplink multi-TTI grant between consecutive scheduled uplink subframes. The subframes used for uplink traffic can be maximized with short scheduling delay. Further, in some embodiments, when the traffic in the system is not uplink heavy, the gap subframe is not configured so the amount of TDD switching in the system is reduced.

The following acronyms are used throughout this disclosure.

3GPP 3$^{rd}$ Generation Partnership Project
D2D Device-to-Device

DFT Discrete Fourier Transform
eNB Evolved Node B
EPDCCH Enhanced Physical Downlink Control Channel
E-UTRA Evolved Universal Terrestrial Radio Access
GP Guard Period
LTE Long Term Evolution
LTE Rel-11 Long Term Evolution Release 11
ms Millisecond
multi-TTI Multiple Transmit Time Interval
OFDM Orthogonal Frequency Division Multiplexing
PDCCH Physical Downlink Control Channel
PDSCH Physical Downlink Shared Channel
PSS Primary Synchronization Signal
PUSCH Physical Uplink Shared Channel
RRC Radio Resource Control
SC-FDMA Single Carrier Frequency Division Multiple Access
SSS Secondary Synchronization Signal
TDD Time Division Duplex
TS Technical Specification
TTI Transmission Time Interval Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless device operating according to a Time Division Duplexing, TDD, scheme in a cellular communications network, the method comprising:
while operating according to the TDD scheme:
receiving a first uplink grant from a radio network node that assigns radio resources for a multiple transmit time interval uplink transmission, the radio resources comprising a set of consecutive uplink subframes; and
interrupting an uplink transmission on the radio resources during a gap in the radio resources assigned for the multiple transmit time interval uplink transmission to receive a second uplink grant, the gap comprising a time domain gap within the set of consecutive uplink subframes.

2. The method of claim 1 further comprising:
performing a first portion of the multiple transmit time interval uplink transmission prior to the gap; and
performing a remaining portion of the multiple transmit time interval uplink transmission after the gap.

3. The method of claim 1 wherein a position of the gap is a position relative to an end of the radio resources assigned for the multiple transmit time interval uplink transmission by the first uplink grant.

4. The method of claim 3 wherein an amount of time between the gap and the end of the radio resources is greater than or equal to an uplink scheduling delay.

5. The method of claim 4 wherein the uplink scheduling delay is greater than zero.

6. The method of claim 1 wherein a position of the gap is defined by a cellular communications network standard.

7. The method of claim 1 further comprising receiving signaling comprising an indication of a position of the gap from the radio network node.

8. The method of claim 1 wherein a position of the gap is semi-statically configured individually for the wireless device and/or for a plurality of wireless devices including the wireless device.

9. The method of claim 1 further comprising receiving Radio Resource Control, RRC, signaling comprising an indication of a position of the gap from the radio network node.

10. The method of claim 1 further comprising receiving a dynamic configuration of the gap.

11. The method of claim 10 wherein receiving the dynamic configuration of the gap comprises receiving an indication of a presence of the gap in the first uplink grant and/or an indication of a position of the gap in the first uplink grant.

12. The method of claim 1 further comprising:
prior to interrupting the uplink transmission during the gap, determining whether the gap is to be used;
upon determining that the gap is to be used, interrupting the uplink transmission during the gap; and
upon determining that the gap is not to be used, continuing the uplink transmission during the gap without interruption.

13. The method of claim 12 wherein determining whether the gap is to be used comprises determining that the gap is to be used when a number of transmit time intervals assigned in the first uplink grant is greater than a predefined threshold.

14. The method of claim 13 wherein the predefined threshold is greater than or equal to an uplink scheduling delay.

15. The method of claim 12 wherein a position of the gap is a predefined position relative to an end of the radio resources assigned for the multiple transmit time interval uplink transmission by the first uplink grant, and determining whether the gap is to be used comprises determining that the gap is not to be used when the position of the gap is prior to a start of the radio resources assigned by the first uplink grant.

16. The method of claim 12 wherein determining whether the gap is to be used comprises determining that the gap is not to be used when a fixed downlink subframe is further scheduled by the first uplink grant within the radio resources to receive the second uplink grant.

17. A wireless device operating according to a Time Division Duplexing, TDD, scheme in a cellular communications network, the wireless device comprising:
a transceiver;
a processor associated with the transceiver; and
memory containing instructions executable by the processor, whereby the wireless device is operative to:
while operating according to the TDD scheme:
receive, via the transceiver, a first uplink grant from a radio network node that assigns radio resources for a multiple transmit time interval uplink transmission, the radio resources comprising a set of consecutive uplink subframes; and
interrupting an uplink transmission on the radio resources during a gap in the radio resources assigned for the multiple transmit time interval uplink transmission to receive a second uplink grant, the gap comprising a contiguous gap spanning at least one subframe within the set of consecutive uplink subframes.

18. The wireless device of claim 17 further comprising:
performing a first portion of the multiple transmit time interval uplink transmission prior to the gap; and
performing a remaining portion of the multiple transmit time interval uplink transmission after the gap.

19. The wireless device of claim 17 wherein a position of the gap is a position relative to an end of the radio resources assigned for the multiple transmit time interval uplink transmission by the first uplink grant.

20. The wireless device of claim 19 wherein an amount of time between the gap and the end of the radio resources is greater than or equal to an uplink scheduling delay.

21. The wireless device of claim 20 wherein the uplink scheduling delay is greater than zero.

22. The wireless device of claim 17 wherein a position of the gap is defined by a cellular communications network standard.

23. The wireless device of claim 17 further comprising receiving signaling comprising an indication of a position of the gap from the radio network node.

24. The wireless device of claim 17 wherein a position of the gap is semi-statically configured for individual wireless devices and/or for a plurality of wireless devices.

25. The wireless device of claim 17 further comprising receiving a dynamic configuration of the gap.

26. The wireless device of claim 17 further operative to:
   determine, prior to interrupting the uplink transmission during the gap, whether the gap is to be used;
   upon determining that the gap is to be used, interrupt the uplink transmission during the gap; and
   upon determining that the gap is not to be used, continue the uplink transmission during the gap without interruption.

27. The wireless device of claim 26 wherein determining whether the gap is to be used comprises determining that the gap is to be used when a number of transmit time intervals assigned in the first uplink grant is greater than a predefined threshold.

28. The wireless device of claim 27 wherein the predefined threshold is greater than or equal to an uplink scheduling delay.

29. The wireless device of claim 26 wherein a position of the gap is a predefined position relative to an end of the radio resources assigned for the multiple transmit time interval uplink transmission by the first uplink grant, and determining whether the gap is to be used comprises determining that the gap is not to be used when the position of the gap is prior to a start of the radio resources assigned by the first uplink grant.

30. The wireless device of claim 26 wherein determining whether the gap is to be used comprises determining that the gap is not to be used when a fixed downlink subframe is further scheduled by the first uplink grant within the radio resources to receive the second uplink grant.

* * * * *

UNITED STATES PATENT AND TRADEMARK OFFICE
CERTIFICATE OF CORRECTION

PATENT NO. : 11,197,271 B2
APPLICATION NO. : 16/351014
DATED : December 7, 2021
INVENTOR(S) : Sahlin et al.

It is certified that error appears in the above-identified patent and that said Letters Patent is hereby corrected as shown below:

On the Title Page

On Page 2, item (56), under "OTHER PUBLICATIONS", in Column 2, Line 2, delete "Network" and insert -- Network; --, therefor.

On Page 2, item (56), under "OTHER PUBLICATIONS", in Column 2, Line 7, delete "Network" and insert -- Network; --, therefor.

On Page 2, item (56), under "OTHER PUBLICATIONS", in Column 2, Line 12, delete "Network" and insert -- Network; --, therefor.

Signed and Sealed this
Nineteenth Day of April, 2022

Katherine Kelly Vidal
*Director of the United States Patent and Trademark Office*